(12) United States Patent
Cao et al.

(10) Patent No.: US 11,196,099 B2
(45) Date of Patent: Dec. 7, 2021

(54) FORMATION CAPACITY-GRADING EQUIPMENT WITH HOT- AND COLD-PRESS CLAMPS FOR SOFT-PACKAGE LITHIUM BATTERY

(71) Applicant: ZHEJIANG HANGKE TECHNOLOGY INCORPORATED COMPANY, Hangzhou (CN)

(72) Inventors: Ji Cao, Hangzhou (CN); Zheng Cao, Hangzhou (CN); Wei Liu, Hangzhou (CN)

(73) Assignee: ZHEJIANG HANGKE TECHNOLOGY INCORPORATED COMPANY, Hangzhou (CN)

( * ) Notice: Subject to any disclaimer, the term of this patent is extended or adjusted under 35 U.S.C. 154(b) by 201 days.

(21) Appl. No.: 16/632,369

(22) PCT Filed: Sep. 19, 2019

(86) PCT No.: PCT/CN2019/106553
§ 371 (c)(1),
(2) Date: Jan. 19, 2020

(87) PCT Pub. No.: WO2020/103551
PCT Pub. Date: May 28, 2020

(65) Prior Publication Data
US 2021/0210797 A1    Jul. 8, 2021

(30) Foreign Application Priority Data

Nov. 22, 2018 (CN) .......................... 201811398297.6

(51) Int. Cl.
*H01M 4/02* (2006.01)
*H01M 10/42* (2006.01)
*H01M 10/058* (2010.01)
*H01M 10/44* (2006.01)

(52) U.S. Cl.
CPC ..... *H01M 10/4285* (2013.01); *H01M 10/058* (2013.01); *H01M 10/441* (2013.01); *H01M 10/446* (2013.01)

(58) Field of Classification Search
CPC ...................................................... H01M 4/02
See application file for complete search history.

(56) References Cited

U.S. PATENT DOCUMENTS

2015/0340725 A1* 11/2015 Chen ................. H01M 10/0583
29/730

* cited by examiner

*Primary Examiner* — Jacob B Marks

(57) ABSTRACT

The present invention provides a formation capacity-grading equipment with hot- and cold-press clamps for a soft-package lithium battery, which comprises a plurality of sets of capacity grading devices and a maintenance unit for connecting the capacity grading device, wherein the capacity grading devices are superimposed on each other to form a layered structure, and the capacity grading devices are kept to be axially parallel to each other; the maintenance unit is mounted lateral to the capacity grading devices; and the capacity grading device comprises an outer frame, a hot-press formation capacity grading hot-press clamp unit, a cold-press forming clamp unit, a charge and discharge formation control unit, a battery loading and unloading unit, a transplant manipulator unit, a production process control and detection and safety alarm unit, central controller, and a database unit.

7 Claims, 18 Drawing Sheets

FORMATION CAPACITY-GRADING EQUIPMENT WITH HOT- AND COLD-PRESS CLAMPS FOR SOFT-PACKAGE LITHIUM BATTERY

TECHNICAL FIELD

The present invention relates to the technical field of manufacturing equipment of soft-package lithium batteries, and particularly to a formation capacity-grading equipment with hot- and cold-press clamps for a soft-package lithium battery.

BACKGROUND

In the production process of soft-package lithium batteries, formation, capacity grading, hot pressing, and cold pressing are important produces determining the quality of a battery after the lithium battery is formed. The formation is to activate the internal activity of the lithium battery to ensure its good charge and discharge performance and cycle life. Capacity grading is the most basic and most important process for determining the requirements of consistency for the battery. The existing process has a quite long production period, and the use of a new heating and pressing formation and capacity grading method can effectively reduce the production period and improve the performance and quality consistency of the battery.

In the existing soft-package lithium battery production equipment and process, the hot-press formation and capacity grading procedure and the cold-press forming of the lithium battery are carried out separately, thus requiring a variety of different equipment or clamp tooling, including a separate loading and unloading device. The process comprises four divided procedures, so that the manual transfer operation has a large workload, the production efficiency is low, the equipment investment is high, and the floor space is large.

SUMMARY

Technical Problem

To solve the above problems, the present invention proposes a formation capacity-grading equipment with hot- and cold-press clamps for a soft-package lithium battery, which has increased production efficiency and reduced time and investment cost, and allows the combination and superimposition of multiple sets of equipment to form a complete production line, as desired by the process. Different from the previous equipment, through the integration of some production lines, the production process of the lithium battery is optimized, the time is shortened, and the previous procedure of standing and others after formation are integrated into the equipment. Compared with the original process time, the time is reduced by two-thirds, and the production time cost of the battery is reduced by half. Moreover, the turnover number and time of the battery are reduced, ensuring the quality and consistency requirements of the battery.

The formation capacity-grading equipment with hot- and cold-press clamps for a soft-package lithium battery according to the present invention comprises: a plurality of sets of capacity grading devices and a maintenance unit connecting the capacity grading devices, wherein the capacity grading devices are superimposed on each other to form a layered structure, and the capacity grading devices are kept to be axially parallel to each other; the maintenance unit is mounted on a side of the capacity grading devices; and the capacity grading device comprises an outer frame, a hot-press formation capacity grading hot-press clamp unit, a cold-press forming clamp unit, a charge and discharge formation control unit, a battery loading and unloading unit, a transplant manipulator unit, a production process control and detection and safety alarm unit, a central controller, and a database unit, wherein a work station for processing the battery is provided on the outer frame; both the hot-press formation capacity grading hot-press clamp unit and the charge and discharge formation control unit are axially disposed inside the outer frame, and each set of the hot-press formation capacity grading hot-press clamp unit corresponds to a respective set of the charge and discharge formation control unit; the cold-press forming clamp unit, the battery loading and unloading unit, and the transplant manipulator unit are arranged at the work station of the outer frame, wherein the cold-press forming clamp unit is arranged downstream of the hot-press formation capacity grading hot-press clamp unit, and the transplant manipulator unit moves in an extent covering the entire work station; the production process control and detection and safety alarm unit, the central controller, and the database unit are all mounted on the outer frame; a signal transmission end of the production process control and detection and safety alarm unit is in bidirectional communication with a signal transmission end of the central controller; and a signal transmission end of the central controller is electrically connected to a signal transmission end of the database unit.

The hot-press formation capacity grading hot-press clamp unit comprises a first servomotor for providing a driving force, a first deceleration motor for proportionally adjusting the driving force provided by the servomotor, a first gear box for transmitting the reduced driving force, a first ballscrew nut pair for converting the rotation to horizontal movement, a plurality of first clamp plates for isolating and capacity-grading pressing the batteries, a first guide rod for providing horizontal support to the first clamp plate, a first pressure detection assembly for measuring the pressure produced by the clamp plate driven by the first servomotor, and a heat control assembly for heating, wherein an output shaft of the first servomotor is coupled to an input shaft of the first deceleration motor; an output shaft of the first deceleration motor is connected to an end portion of a first screw of the first ballscrew nut pair via the first gear box to drive the first screw to rotate about its central axis; the first screw is axially mounted on and rotatably connected to the outer frame; a first ball nut of the first ballscrew nut pair is mounted around and screwed onto the first screw; the first ball nut is fixed to the outermost first clamp plate; adjacent first clamp plates are connected by connectors to achieve mutual linkage between the first clamp plates to simultaneously clamp or loosen the soft-package lithium batteries located between two adjacent clamp plates; the first clamp plate is mounted around the first guide rod, and the first clamp plate is in clearance fit with the first guide rod, to enable the first clamp plate to axially slide along the first guide rod; the first pressure detection assembly is sandwiched between the first clamp plate and the first ballscrew nut pair; and the heat control assembly is arranged on the first pressure control assembly.

The cold-press forming clamp unit comprises a second servomotor for providing a driving force, a second deceleration motor for proportionally adjusting the driving force provided by the second servomotor, a second gear box for transmitting the reduced driving force, a second ballscrew nut pair for converting the rotation to horizontal movement, a plurality of second clamp plates for isolating and pressing the batteries, a second guide rod for providing horizontal support to the second clamp plate, a second pressure detection assembly for measuring the pressure produced by the clamp plate driven by the servomotor, and an air cooling mechanism and a water cooling mechanism for cooling the battery, wherein an output shaft of the second servomotor is coupled to an input shaft of the second deceleration motor; an output shaft of the second deceleration motor is connected to an end portion of a second screw of the first ballscrew nut pair via the second gear box to drive the second screw to rotate about its central axis; the second screw is axially mounted on and rotatably connected to the outer frame; a second ball nut of the second ballscrew nut pair is mounted around and screwed onto the second screw; the second ball nut is fixed to the outermost second clamp plate; adjacent second clamp plates are connected by connectors to achieve mutual linkage between the second clamp plates to simultaneously clamp or loosen the soft-package lithium batteries between two adjacent clamp plates; the second clamp plate is mounted around the second guide rod, and the second clamp plate is in clearance fit with the second guide rod, to enable the second clamp plate to axially slide along the second guide rod; the second pressure detection assembly is sandwiched between the second clamp plate and the second ballscrew nut pair; the air cooling mechanism comprises a baffle, a changeover screw, a support plate assembly, and a fan assembly, wherein the baffle is in one-to-one correspondence with the second clamp plate, the baffle is attached to the surface of a corresponding second clamp plate and supported by the battery support plate fixed on the outer frame, and adjacent two baffles are spaced with a gap for positioning the battery therebetween; the changeover screw is screwed to the baffle, to achieve the adjustment of the gap between adjacent baffles; and the fan assembly is provided at a working station of the cold-press forming clamp unit on the outer frame, and has an outlet facing the baffle; and the water cooling mechanism comprises a water pipe in communication with an external water source and a control valve for controlling the flow rate in the water pipe, wherein the surface of the water pipe is fitted to the surface of a corresponding second clamp plate, and each of the second clamp plates is provided with a corresponding length of water pipe, and the control valve is arranged on the water pipe.

The charge and discharge device comprises a charge and discharge drive board for energizing the polymer soft-package battery, a connecting wire, a power source and a mounting frame, wherein the charge and discharge drive board and the power source are mounted on the mounting frame, wherein a power supply end of the charge and discharge drive board is connected to the electrode lug of the polymer soft-package battery via the connecting wire and a contact pin; and a power supply end of the power source is electrically connected to a charging end of the charge and discharge drive board, to realize a power supply module for charging and discharging the battery.

The transplant manipulator unit comprises a horizontal moving mechanism, a vertical lifting mechanism, a battery clamping mechanism, and a transplant base, wherein the horizontal moving mechanism comprises a third servomotor for providing a horizontal driving force, a toothed rack for transmitting the horizontal driving force, a horizontal guide rail for allowing the battery clamping mechanism to slide axially and horizontally along the outer frame, and a transplant mounting bracket for mounting the vertical lifting mechanism, wherein the third servomotor is mounted on the transplant base, an output gear of the third servomotor is engaged with the toothed rack, the toothed rack is fixed to the transplant mounting bracket, and the toothed rack is slidably connected to the horizontal guide rail; the vertical lifting mechanism comprises a fourth servomotor for providing a vertical driving force and a screw for transmitting the vertical driving force, wherein the fourth servomotor is mounted on the transplant mounting bracket, an output shaft of the fourth servomotor is fixed to one end of the screw by a timing pulley and belt, and the screw is screwed to the battery clamping mechanism; the battery clamping mechanism comprises a battery gripping jaw for gripping the battery and a jaw mounting plate for mounting the battery gripping jaw, wherein the jaw mounting plate is screwed to the screw, a bottom of the jaw mounting plate is provided with a row of battery gripping jaws along its axial direction, and the battery gripping jaws are arranged in a direction that is the same as with the direction of arrangement for the first clamp plates of the hot-press formation capacity grading hot-press clamp unit; the horizontal moving mechanism motions in the horizontal direction under the action of the gear and toothed rack driven by the third servomotor; the vertical lifting mechanism motions up and down in the vertical direction under the action of the screws at both sides caused to move by the timing pulley and belt driven by the fourth servomotor; and the battery clamping mechanism is a mechanism for gripping the battery.

The battery loading and unloading unit comprises a double speed chain conveyor unit, a tray loading and unloading manipulator unit, a battery scanning and rotating unit, a battery NG unit, a hydraulic loading and unloading manipulator unit, and a battery transit hydraulic machine, wherein the double speed chain conveyor unit, the tray loading and unloading manipulator unit, the battery scanning and rotating unit, the battery NG unit, the hydraulic loading and unloading manipulator unit, the battery transit hydraulic machine, and the central controller are all mounted on the outer frame, and each of the units is in signal connection with the central controller.

The central controller comprises an automatic production process control unit, a temperature control unit, a pressurizing and pressure holding unit, a loading and unloading control unit, a charge and discharge cycle control unit, an alarm control unit, a human-machine interface, and a data processing unit, wherein a signal input of the automatic production process control unit is electrically connected to a signal output of the human-machine interface; a signal output of the automatic production process control unit, a signal input of the temperature control unit, a signal input of the pressurizing and pressure holding unit, and a signal input of the charge and discharge cycle control unit are respectively electrically connected to a corresponding signal input of the data processing unit; signal outputs of the data processing unit are respectively electrically connected to a signal input of the loading and unloading control unit, a signal input of the transplant manipulator unit, and a signal input of the safety alarm control unit; signal outputs of the temperature control unit are respectively electrically connected to a control end of the first servomotor in the hot-press formation clamp unit and a control end of the second servomotor in the cold-press forming clamp unit; a signal input of the pressurizing and pressure holding unit is in bidirectional signal connection respectively with a signal output of the first pressure detection assembly in the hot-press formation clamp unit and a signal output of the second pressure detection assembly in the cold-press forming clamp unit; and the control valve of the water cooling mechanism and a control end of the air cooling mechanism in the cold-press forming clamp unit are respectively in signal connection with a corresponding signal output of the temperature control unit.

The maintenance unit comprises a maintenance platform for walking and a stair for climbing, wherein the maintenance platform is disposed at a side of the capacity grading device, and the maintenance platform is arranged along an axial direction of the capacity grading device; and the stair is disposed beside the maintenance platform, and one end of the stair is connected to the maintenance platform and the other end is connected to a mounting face.

The battery loading and unloading unit further comprises a tray unstacking and transferring unit comprising a tray unstacking machine for disassembling multiple layers of trays, a roller conveyor for conveying the tray, a tray positioning assembly and a tray blocking assembly and a tray blocking assembly, where the tray unstacking machine comprises a tray uplifting cylinder assembly, a tray gripping cylinder assembly and a tray unstacking cylinder assembly that are all mounted at a tray unstacking and transferring station on the outer frame, in which a piston rod of the tray uplifting cylinder assembly reciprocates in a vertical direction, and an end portion of the piston rod of the tray uplifting cylinder assembly is fixed to the tray gripping cylinder assembly; a piston rod of the tray gripping cylinder assembly reciprocates in a horizontal direction, and an end portion of the piston rod of the tray gripping cylinder assembly is fitted with a jaw for insertion into the bottom of the tray; the tray unstacking cylinder assembly is arranged on the outer frame beside the tray, and an action portion of the tray unstacking cylinder assembly covers the tray; and control ends of the tray uplifting cylinder assembly, the tray gripping cylinder assembly, and the tray unstacking cylinder assembly are all electrically connected to a corresponding signal output of the controller.

The roller conveyor comprises a first deceleration motor, and a chain roller member, where the deceleration motor is mounted on the outer frame; the chain roller member comprises a plurality of rollers and a drive chain, in which the rollers are mounted on the outer frame through corresponding rotating shafts, the rollers are connected by the drive chain, and one of the rollers is fixed to an output shaft of the first reduction motor; an output end of the chain roller member is arranged at the position of the tray unstacking machine, and an input end extends to a double-speed chain of the double speed chain conveyor unit, and a control end of the first deceleration motor is electrically connected to a corresponding signal pin of the controller.

The tray positioning assembly comprises a tray positioning cylinder and a tray detection sensor, where the tray positioning cylinder is mounted and slidable on a vertically arranged mounting bracket at the tray unstacking and transferring station; a movable end of the tray positioning cylinder is fitted with a bearer for mounting the tray detection sensor; a probe of the tray detection sensor is directed to the tray; a control end of the tray positioning cylinder is electrically connected to a corresponding signal pin of the controller; and a signal output of the tray detection sensor is electrically connected to a corresponding signal input of the controller.

The tray blocking assembly comprises a cylinder, a straight guide rail and a barrier plate, where the straight guide rail is vertically mounted on the outer frame to be adjacent to the tray; the cylinder is mounted and slidable on the straight guide rail; and the cylinder is equipped with the barrier plate for blocking the tray.

The double speed chain conveyor unit comprises a double speed chain conveyor for delivering the tray, a double speed chain, a double speed chain profile and a timing belt assembly, where the double speed chain is mounted on the outer frame by the double speed chain profile; one end of the double speed chain extends to the battery scanning and rotating unit, and the other end extends to the battery NG unit; the double speed chain is connected to an output end of the second deceleration motor by the timing belt assembly to allow the double speed chain to run along the axial direction; and a control end of the second deceleration motor is electrically connected to a corresponding pin of the controller.

The tray loading and unloading manipulator unit is arranged between the double speed chain conveyor unit and the battery scanning and rotating unit, to enable the battery to transport from the double speed chain to the battery scanning and rotating unit; and the tray loading and unloading manipulator unit comprises a tray loading manipulator unit and a tray unloading manipulator unit, wherein each of the tray loading manipulator unit and the tray unloading manipulator unit comprises a first battery gripping jaw for gripping the battery, a first three-dimensional module for enabling the battery gripping motion, and a first battery detection sensor for detecting the gripping state of the battery gripping jaw, in which the first three-dimensional module is disposed near the double speed chain conveyor unit; the first three-dimensional module comprises a first rotary cylinder movable along the X-axis, a second rotary cylinder movable along the Y-axis, and a third rotary cylinder movable along the Z-axis, the third rotary cylinder being mounted on the outer frame, the second rotary cylinder being fixed to the piston rod of the third rotary cylinder, and the first rotary cylinder being fixed to the piston rod of the third rotary cylinder; the first battery gripping jaw is mounted on the piston rod of the first rotary cylinder, to enable the first battery gripping jaw to move along the X axis, Y axis and Z axis; a control end of the first battery gripping jaw is electrically connected to a corresponding signal output of the controller; and the first battery detection sensor is disposed on the battery gripping jaw, and a signal output of the first battery detection sensor is electrically connected to a corresponding signal input of the controller.

The battery scanning and rotating unit comprises a battery transplant module, a battery scanner, and a fourth rotary cylinder for realizing the horizontal rotation of the battery, wherein the fourth rotary cylinder is disposed at a battery scanning and rotating station at one end of the double speed chain between the double speed chain and the battery transplant module; an output end of the fourth rotary cylinder is equipped with a turntable capable of horizontal rotation; the battery scanner and the battery transplant module are mounted on the turntable; the battery is removed from double speed chain to a loading waiting station for a next procedure by the battery transplant module; and a signal output of the battery scanner, a control end of the battery transplant module, and a control end of the fourth rotary cylinder are respectively electrically connected to a corresponding pin of the controller.

The hydraulic loading and unloading manipulator unit comprises a hydraulic loading manipulator unit and a hydraulic unloading manipulator unit, which are used to load the scanned battery to the battery transit hydraulic machine and the battery NG unit, and comprise a second battery gripping jaw for gripping the battery, a second three-dimensional module for enabling the battery gripping motion, and a second battery detection sensor for detecting the gripping state of the battery gripping jaw, in which the second three-dimensional module is disposed near the double speed chain conveyor unit; the second three-dimensional module comprises a fifth rotary cylinder movable along the X-axis, a sixth rotary cylinder movable along the Y-axis, and a seventh rotary cylinder movable along the Z-axis, the seventh rotary cylinder being mounted on the outer frame, the sixth rotary cylinder being fixed to the piston rod of the seventh rotary cylinder, and the sixth rotary cylinder being fixed to the piston rod of the fifth rotary cylinder; the second battery gripping jaw is mounted on the piston rod of the fifth rotary cylinder, to enable the second battery gripping jaw to move along the X axis, Y axis and Z axis; a control end of the second battery gripping jaw is electrically connected to a corresponding signal output of the controller; and the second battery detection sensor is disposed on the second battery gripping jaw, and a signal output of the second battery detection sensor is electrically connected to a corresponding signal input of the controller.

The battery transit hydraulic equipment comprises a timing belt, a timing pulley, a servomotor, a support profile, a mounting support plate, a battery baffle, and a battery tuning cylinder assembly, where the mounting support plate is mounted on the outer frame, the support profile is provided on the mounting support plate, the two ends of the support profile are respectively provided with a timing pulley, and the timing pulleys at the two ends are connected by a timing belt to realize the synchronous rotation of the timing pulleys; one of the timing pulleys is connected to an output shaft of the servomotor; a plurality of vertically arranged battery baffles are provided on the surface of the timing belt, and a gap for accommodating the battery is retained between two adjacent baffles; one end of the battery transit hydraulic machine is connected to the battery NG unit, and the other end of the battery transit hydraulic machine extends to a next work station; and the servomotor drives the timing pulley to rotate, so the battery baffle on the timing belt is dragged to move, which in turn drives the battery between the battery baffles to run.

The battery NG unit is used to sort poor batteries, and comprises rollers, a baffle, a position sensor, a tray positioning cylinder and a battery waiting unit, where the tray positioning cylinder is disposed on a platform for placement of the battery NG unit, and the platform is provided with, on both sides of the platform, a plurality of rollers arranged along an axial direction; the baffle is mounted at an end of the platform for placement, and the position sensor is disposed on the platform at the side where the baffle is mounted; the battery waiting unit is a work station for transiting of the battery after the battery scan fails, and comprises a second battery baffle, a third battery detection sensor, an adjusting wrench, and a mounting seat, where the mounting seat is provided on the outer frame besides the platform for placement, a sliding bracket for mounting the second battery baffle is symmetrically mounted on the mounting seat, the sliding bracket is provided with the adjusting wrench for adjusting the distance between two second battery baffles, and the third battery detection sensor is mounted on the mounting seat between two second battery baffles; and a signal output of the position sensor and a signal output of the third battery detection sensor are electrically connected to a corresponding signal input of the controller, and a control end of the tray positioning cylinder is electrically connected to a corresponding pin of the controller.

The first pressure detection assembly has the same structure as that of the second pressure detection assembly, and comprises a spring buffer module for pressure buffering the clamp plate and a pressure sensor for measuring the pressure produced by the clamp plate driven by the servomotor driven clamp plate, where the spring buffer module is sandwiched between the clamp plate and the ballscrew nut pair, one end of the spring buffer module is connected to the outermost clamp plate at the same side, and the other end is connected to the mounting plate of the ballscrew nut pair; and the pressure sensor is disposed between the mounting plate and the ball nut at the same side.

The bottom of the transplant mounting bracket is equipped with a battery drop prevention mechanism comprising a drop prevention tray and a connecting rod, where the drop prevention tray is provided at the bottom of the transplant mounting bracket via the connecting rod, to ensure that all the battery gripping jaws are located directly above the drop prevention tray.

The timing belt of the conveying hydraulic machine is a closed circular belt, and only a part of the outer surface of the timing belt is provided with a battery baffle along the length direction, and two battery baffles face each other and are paired to form a clamp pair for holding the same battery, where the battery is held in the gap between the same clamp pair.

The present invention aims at improving the technology and optimizing and improving the process, and provides an automatic production equipment with cold- and hot-press clamps for formation and capacity-grading of a soft-package lithium battery. The equipment integrates the formation, capacity grading, hot pressing and cold pressing of the lithium battery into the same equipment, thereby shortening the time between various procedures and simplifying the process. By using only one set of loading and unloading equipment, the four procedures are combined, thus reducing the transit time and number of transfers of the battery. The battery is placed in the battery tray and undergoes automated unmanned operation by means of automated assembly lines and manipulators. In the above solution, the hot-press formation and capacity-grading clamp unit and the cold-press forming unit are able to perform formation, capacity grading, and hot and cold pressing on a soft-package lithium battery at a controllable temperature and a controllable charge and discharge current under a controllable pressure. The hot-press formation clamp, hot-press capacity grading clamp, and cold-press forming clamp function to perform formation and capacity grading on, and heat, pressurize, charge, and discharge batteries of single-sided and double-sided lugs. 1 to N batteries are placed at the left and right positions on a single clamp plate, and the charge and discharge power supply is connected to the electrode lugs of the battery through the lug probe board and wires for formation and capacity grading. The pressurization powering device of the hot-press clamp comprises a motor drive means or a cylinder power means, a transmission reducer, a guide shaft, a heating clamp plate, a pressure sensor, and a lug contact clamp. Steady clamp plates and controllable pressure can be achieved by means of such a mechanism.

In the above solution, the soft-package lithium battery needs to undergo the cooling and forming process immediately after the completion of the hot-press formation and capacity grading process, and the pressure applied by the clamp on the battery is controllable.

In the above solution, to achieve the sufficiently good electrical contact of the soft-package lithium battery in the hot-press clamp, N charge and discharge cycles are performed.

In the above solution, the automatic production process control and detection unit of soft-package lithium battery performs heating temperature control, pressurization and pressure maintenance control, loading and unloading workflow control, charge and discharge cycle control, and smoke detection and safety protection by using an intelligent control device, to achieve the orderly, fast and safe production of the automatic production line.

In the above solution, the system obtains various curves and charts for the parameters of the equipment, the tray position, the working stock position, the charge and discharge curve and the time in real time, and the historical data is stored.

The present invention has the following beneficial effects.

1. Through an integrated solution, the transfer, transit, pressurization, heating, formation, capacity grading, cooling forming, finished product loading, and data collection of the battery are done collectively in a system, thus reducing the transit process between various procedures. Moreover, by combining the original multiple processes into one process, the production efficiency is improved, the consistency of the battery is ensured, and the cost of battery production is reduced.

2. By adopting a standardized and modular design, the various modules can be assembled and superimposed arbitrarily according to the manufacturer's process configuration requirements, to achieve a customizable automatic production line.

DESCRIPTION OF THE EMBODIMENTS

Figure 1:
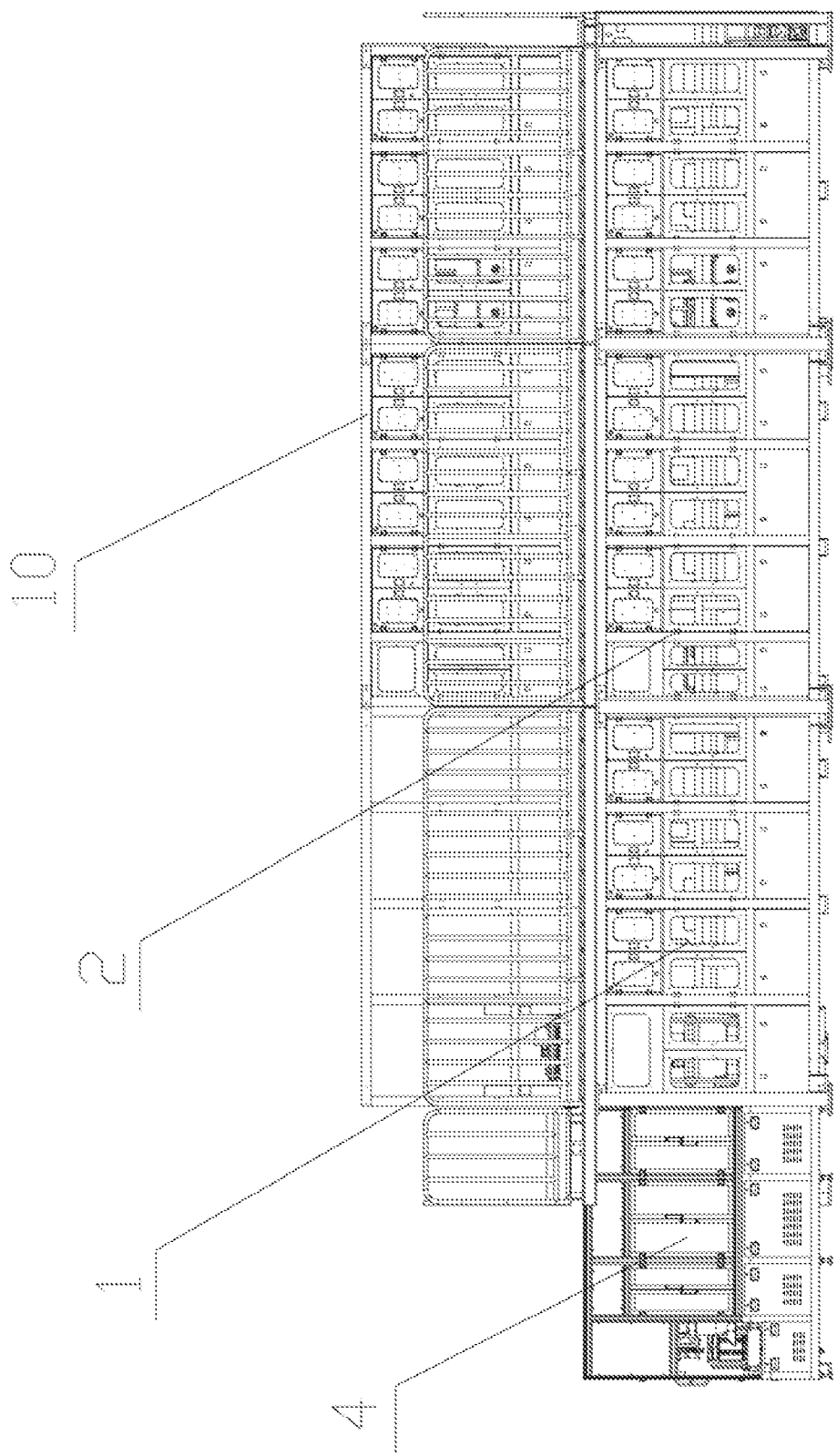
FIG. 1 is a schematic view of an entire production line according to the present invention.
Figure 2:
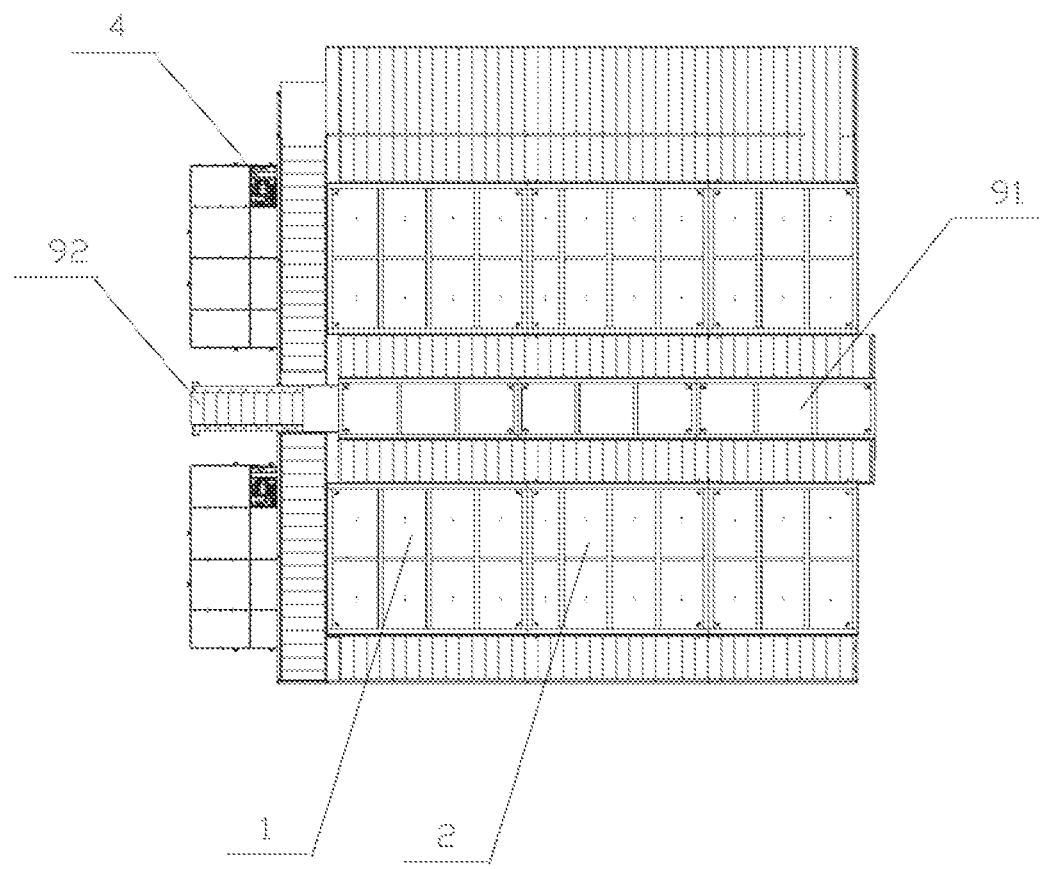
FIG. 2 is a top view of a whole equipment according to the present invention.
Figure 3:
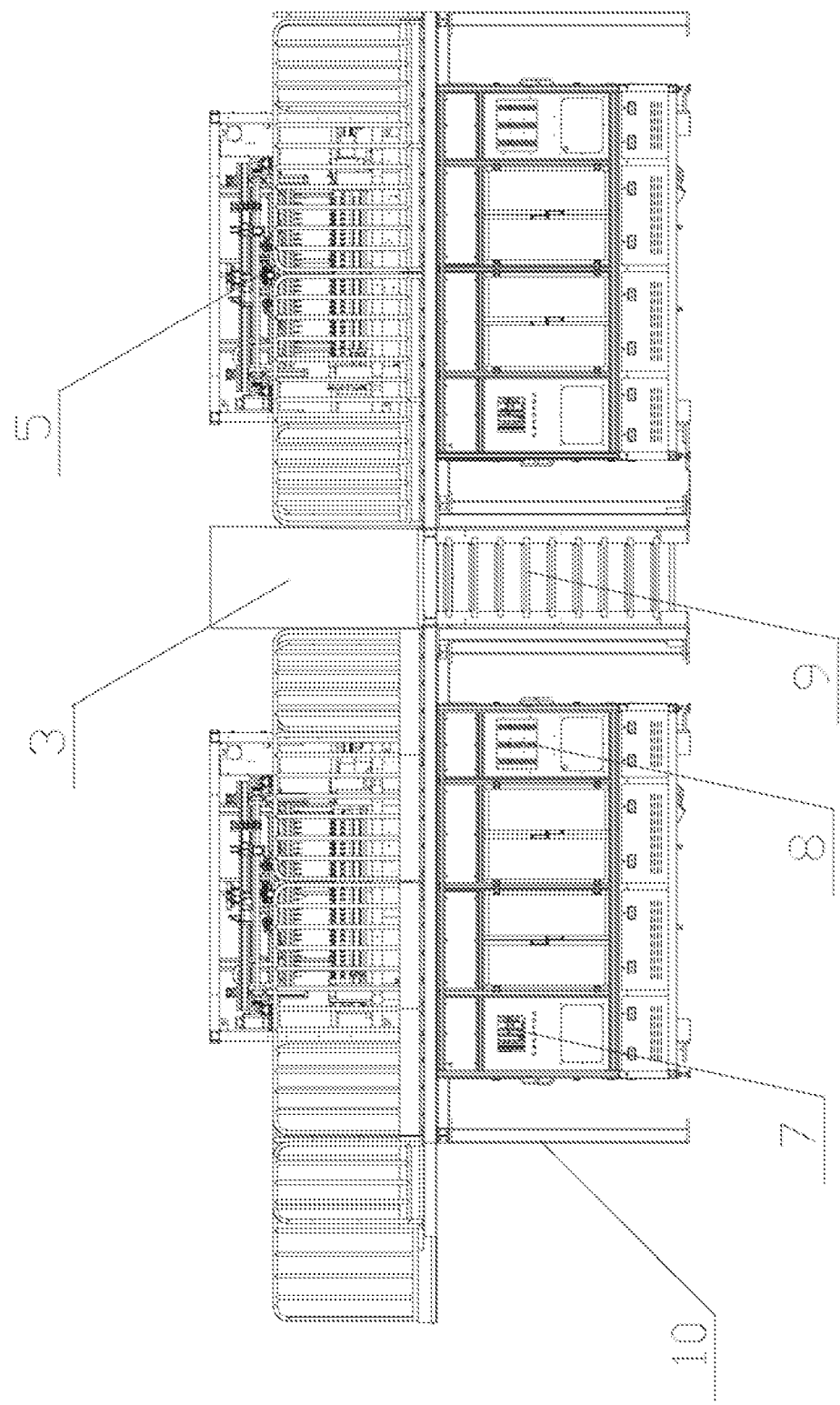
FIG. 3 is a schematic front view according to the present invention.
Figure 4:
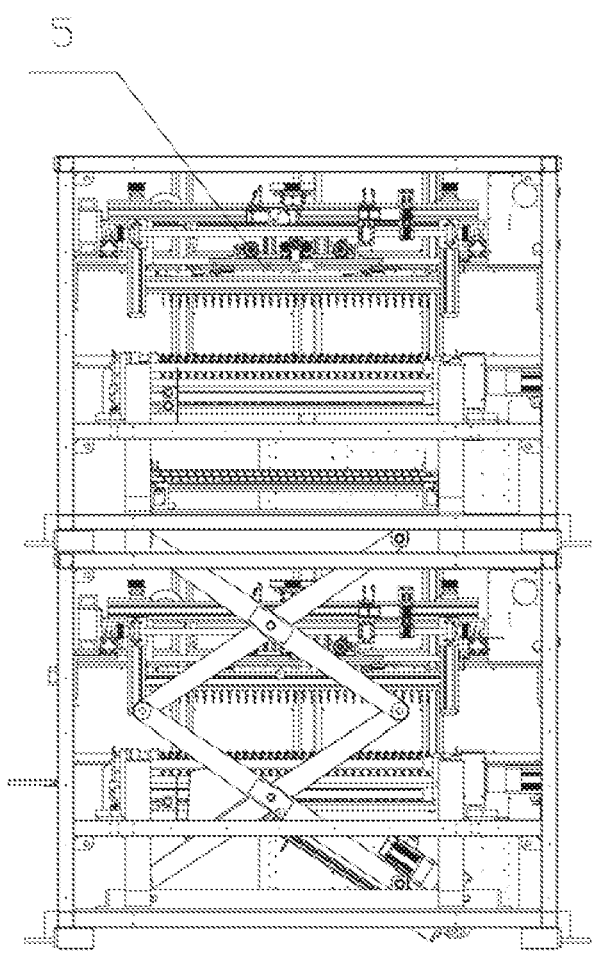
FIG. 4 is a schematic front view of a clamp formation portion according to the present invention.
Figure 5:
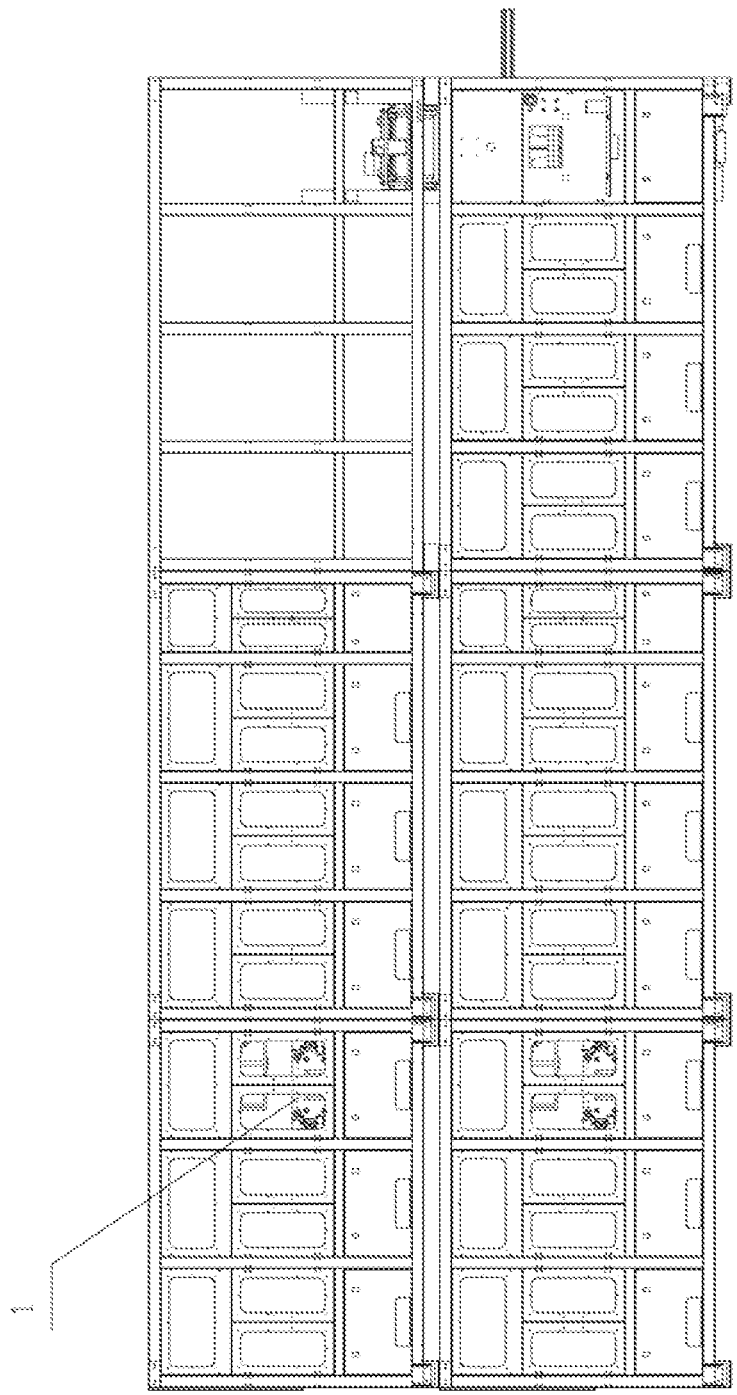
FIG. 5 is a schematic side view of a clamp formation portion according to the present invention.
Figure 6:
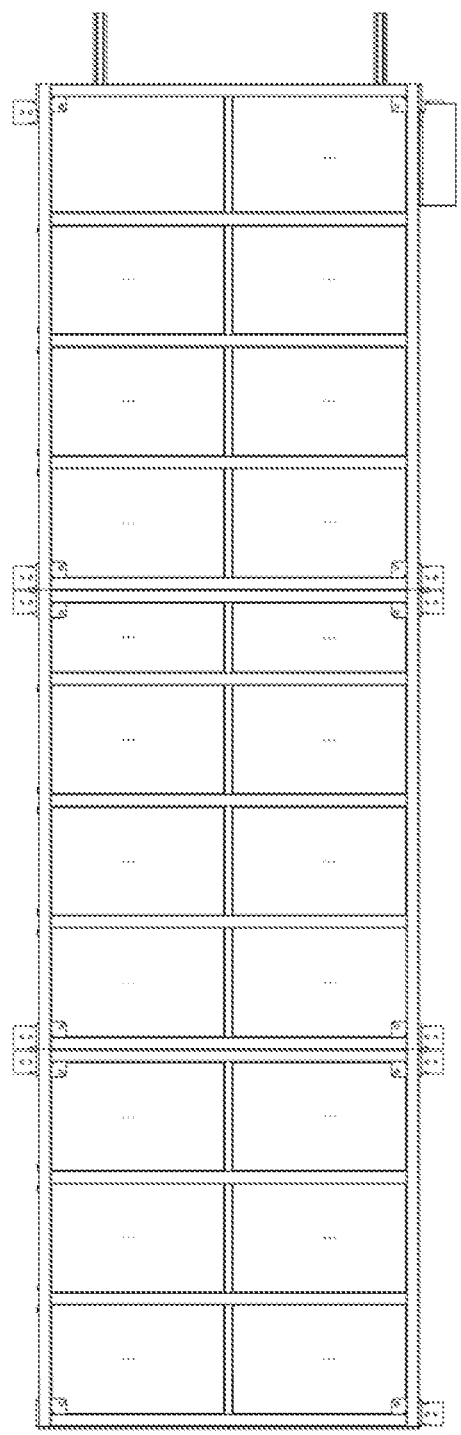
FIG. 6 is a top view of a clamp formation portion according to the present invention.
Figure 7:
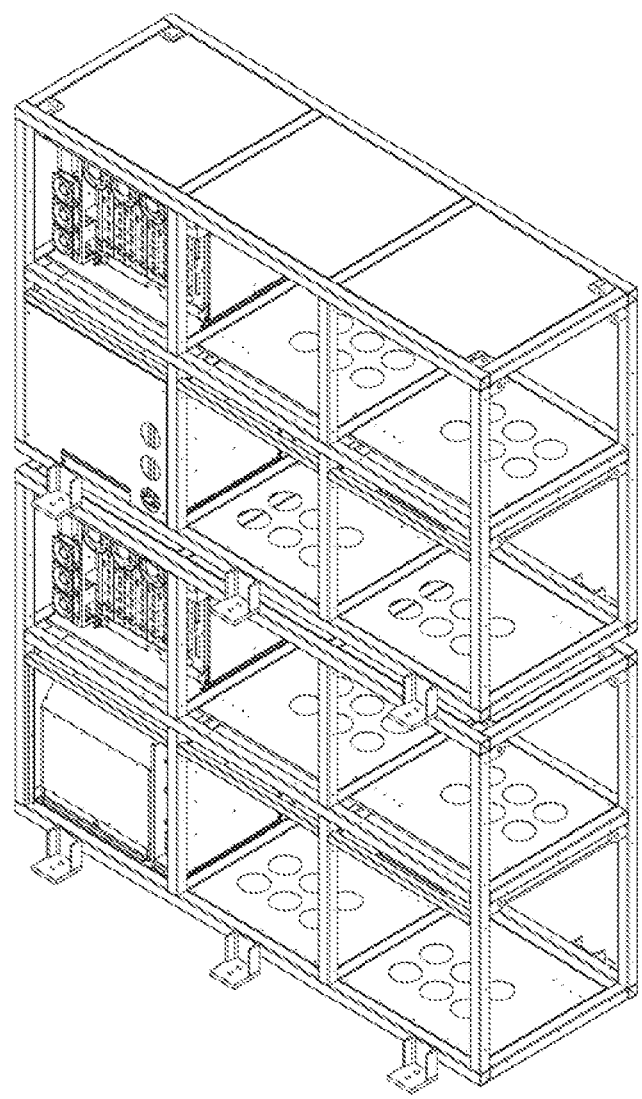
FIG. 7 is a schematic view of a rack in a power box portion according to the present invention.
Figure 8:
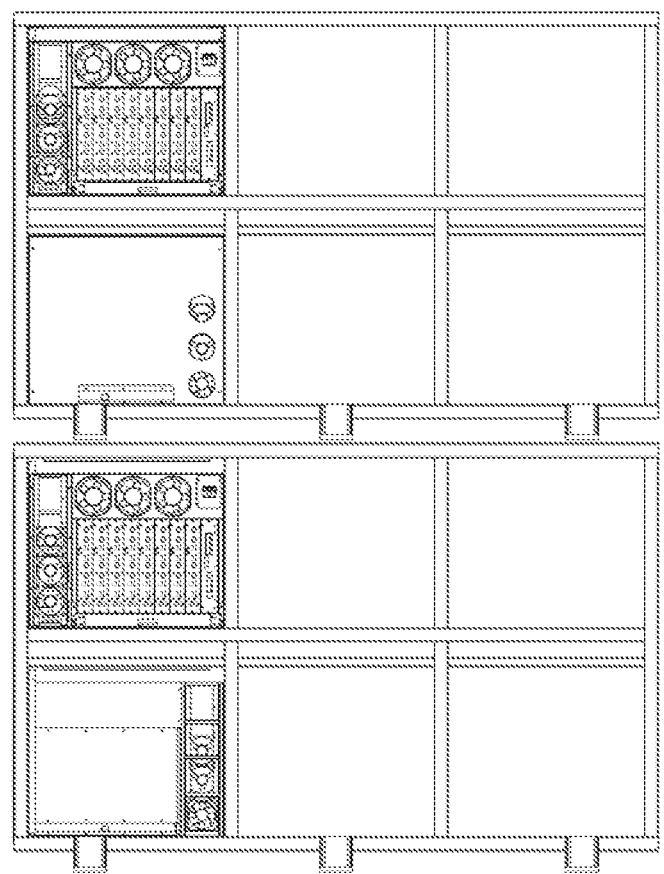
FIG. 8 is a schematic front view of a power box portion according to the present invention.
Figure 9:
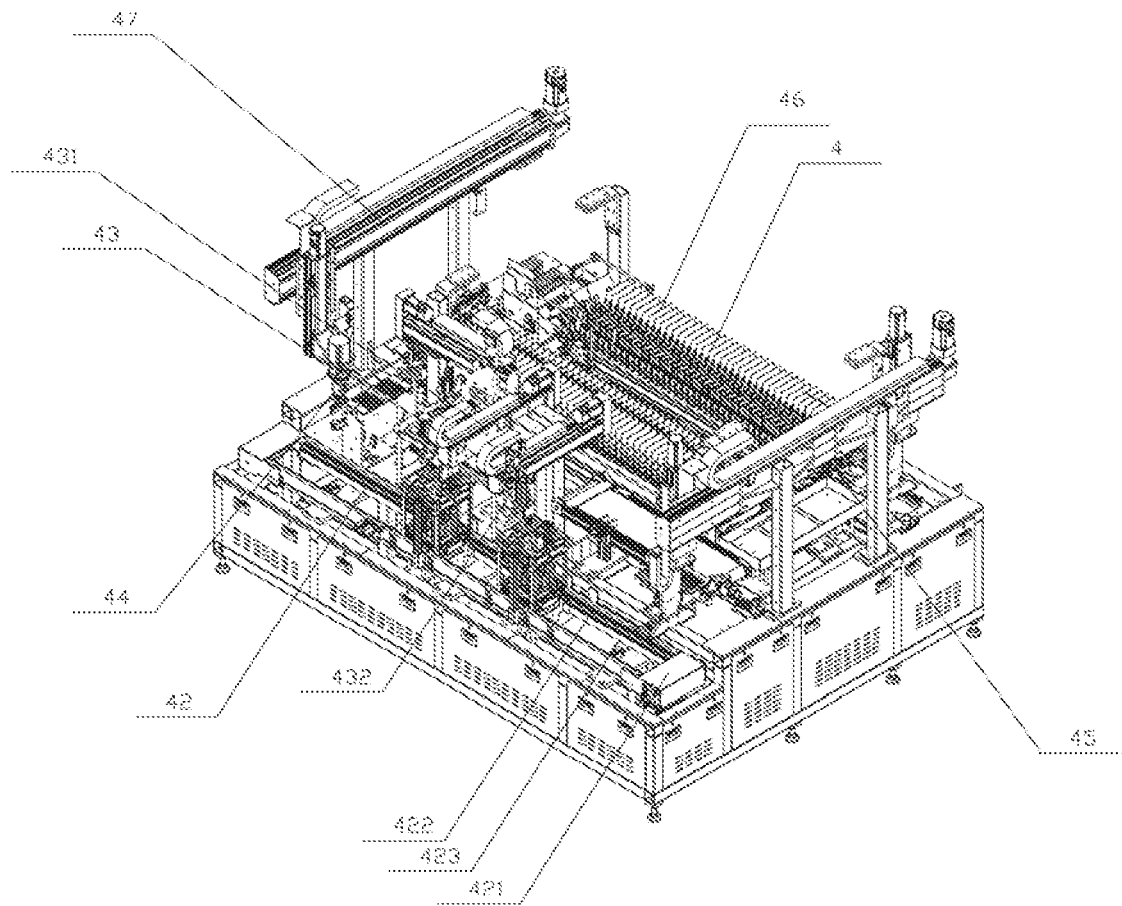
FIG. 9 is a schematic view of a loading and unloading portion according to the present invention.
Figure 10:
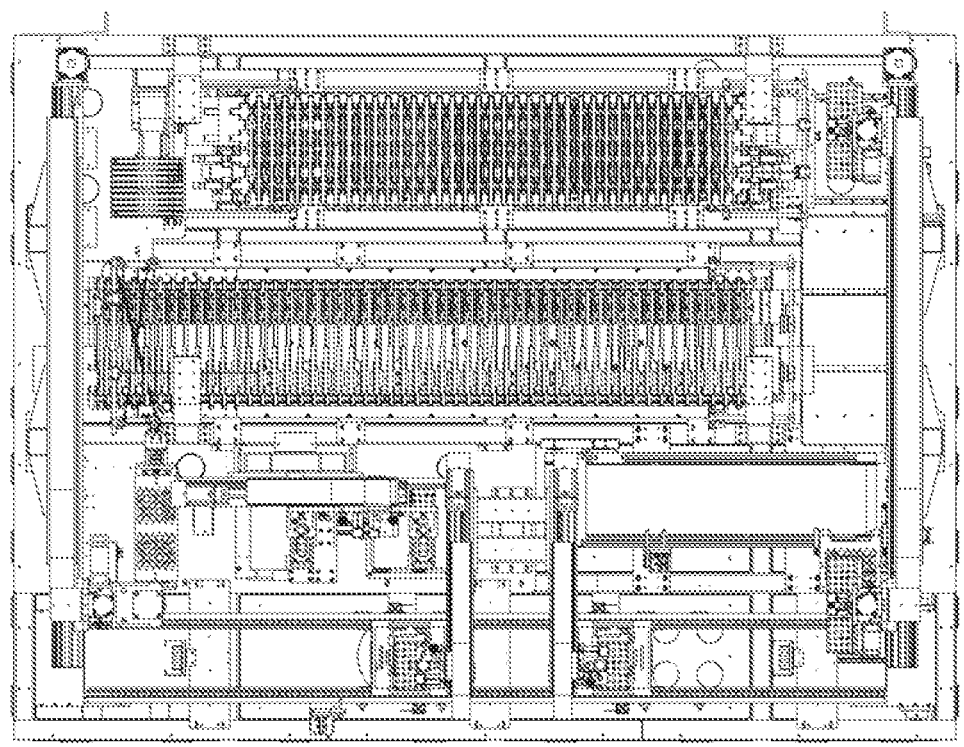
FIG. 10 is a top view of a loading and unloading portion according to the present invention.
Figure 11:
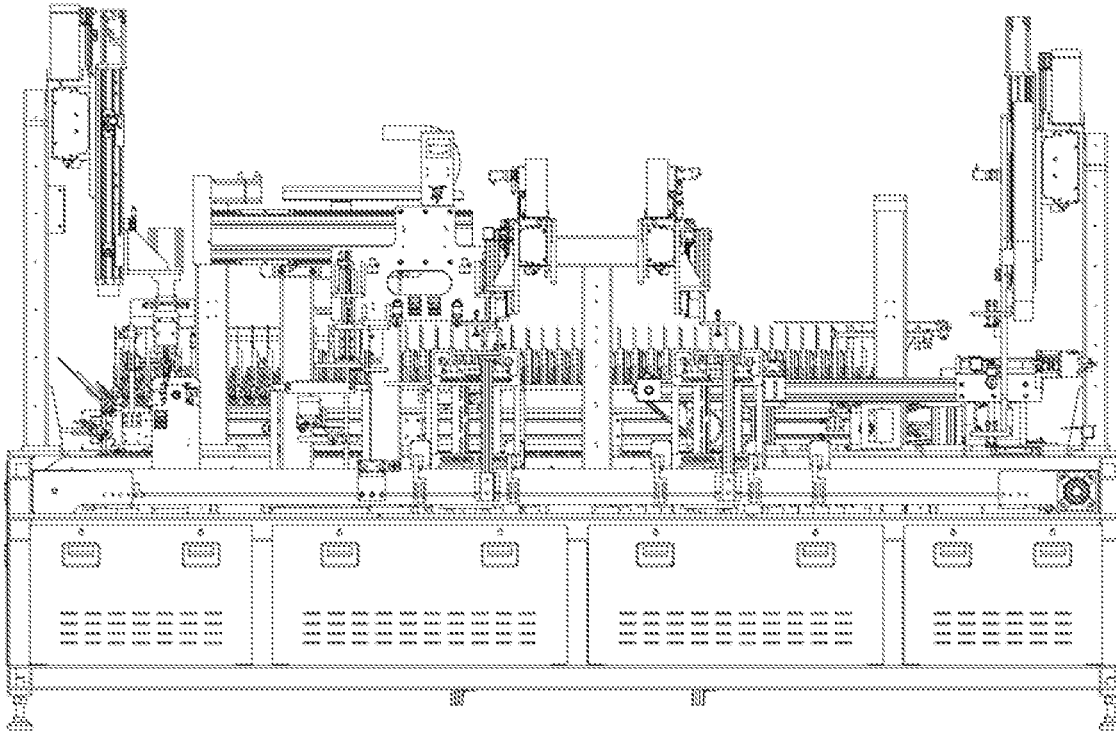
FIG. 11 is a front view of a loading and unloading portion according to the present invention.
Figure 12:
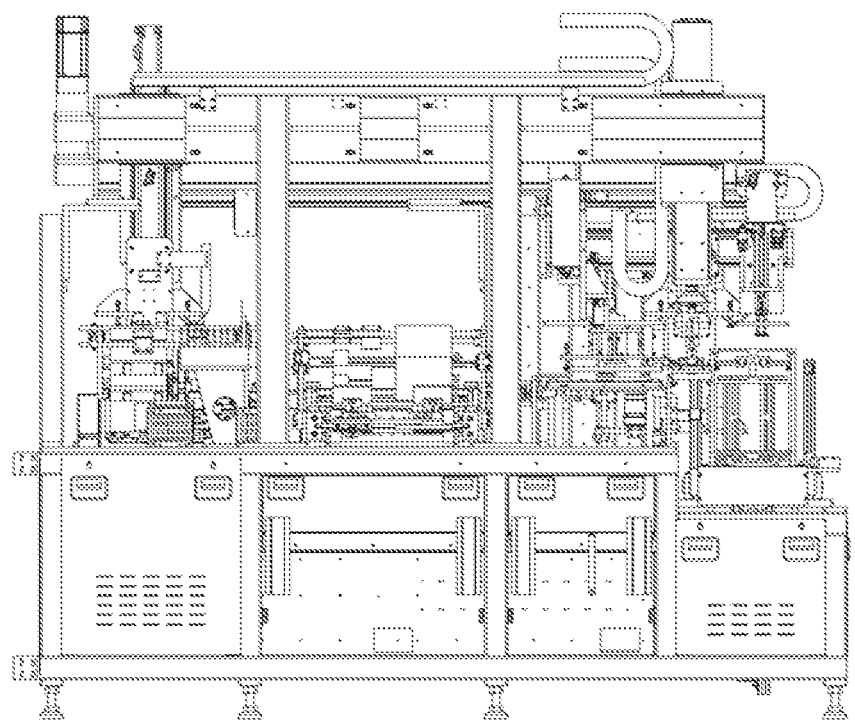
FIG. 12 is a side view of a loading and unloading portion according to the present invention.
Figure 13:
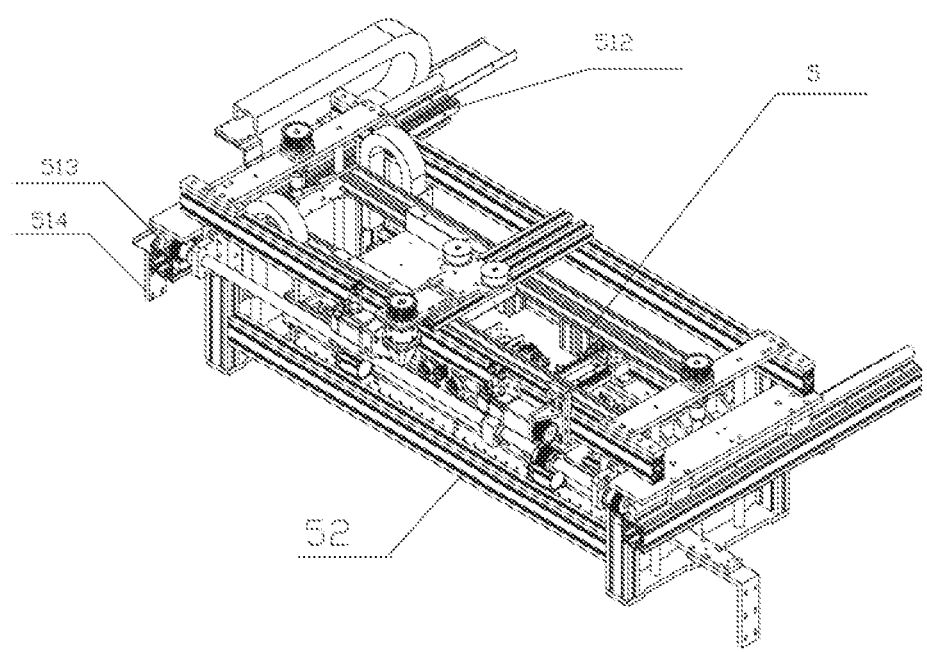
FIG. 13 is a schematic view of a main manipulator for the formation capacity-grading equipment with hot- and cold-press clamps according to the present invention.
Figure 14:
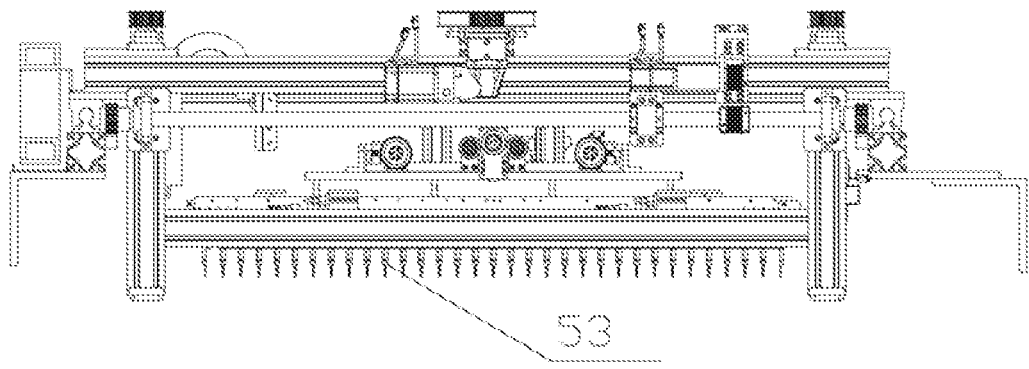
FIG. 14 is a front view of a main manipulator for the formation capacity-grading equipment with hot- and cold-press clamps according to the present invention.
Figure 15:
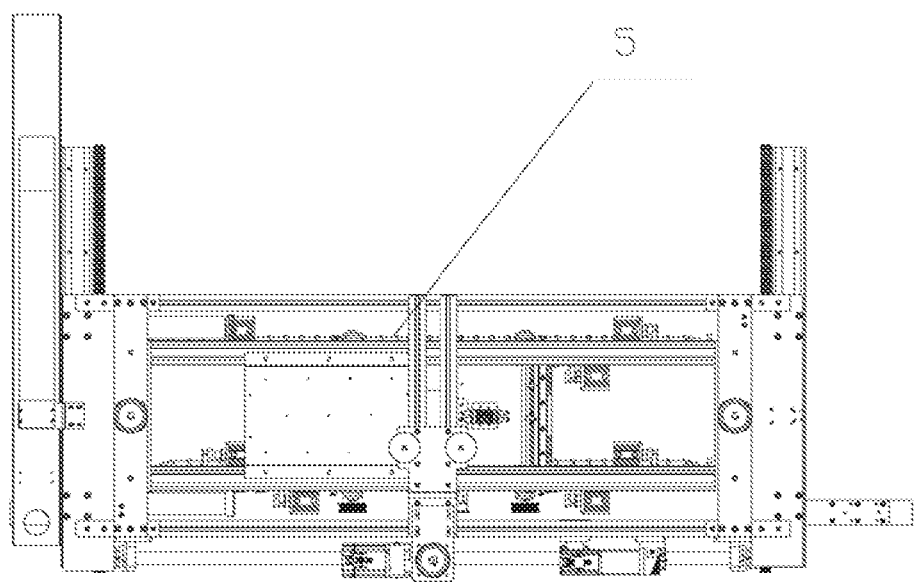
FIG. 15 is a top view of a main manipulator for the formation capacity-grading equipment with hot- and cold-press clamps according to the present invention.
Figure 16:
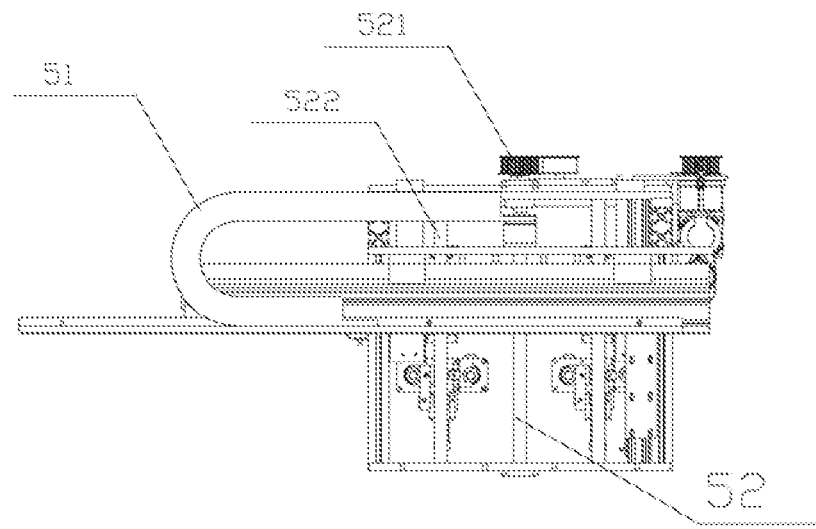
FIG. 16 is a side view of a main manipulator for the formation capacity-grading equipment with hot- and cold-press clamps according to the present invention.
Figure 17:
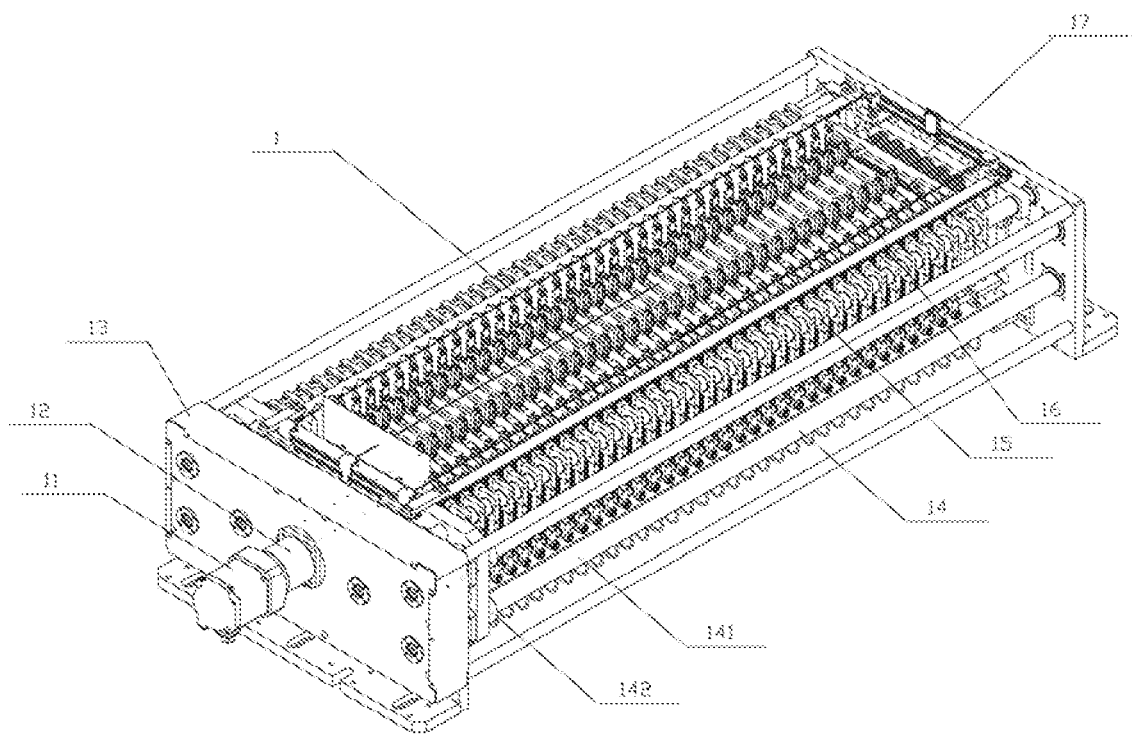
FIG. 17 is a schematic view of a hot-press formation clamp according to the present invention.
Figure 18:
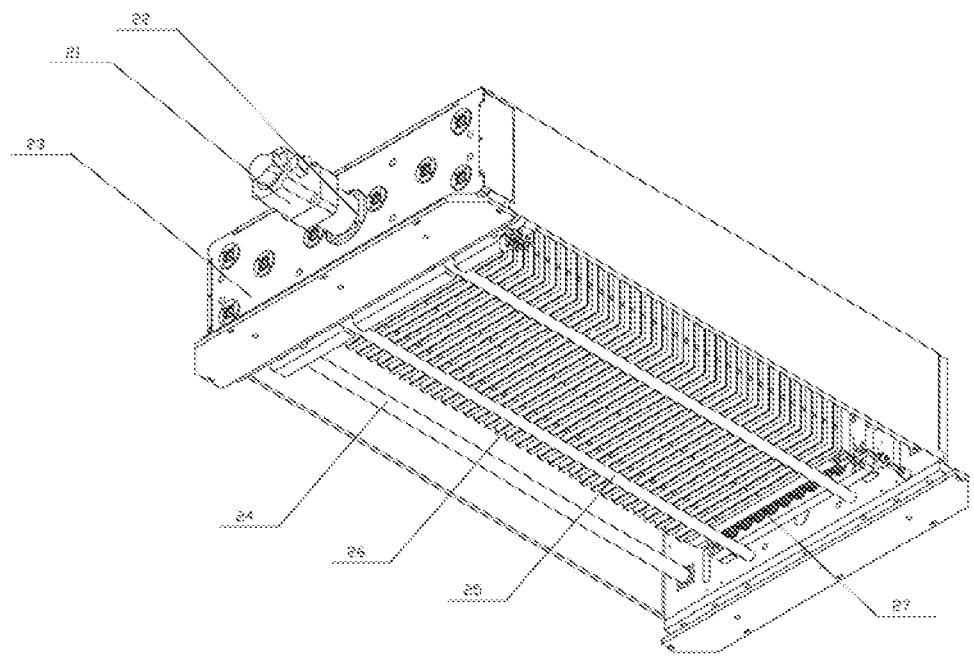
FIG. 18 is a schematic view of a cold-press clamp according to the present invention.
Figure 19:
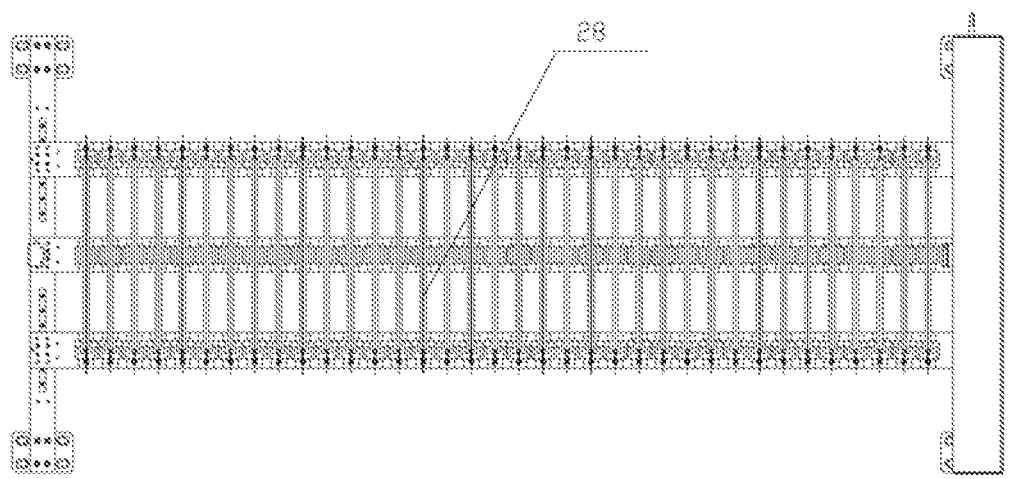
FIG. 19 is a top view of an air cooling clamp according to the present invention.
Figure 20:
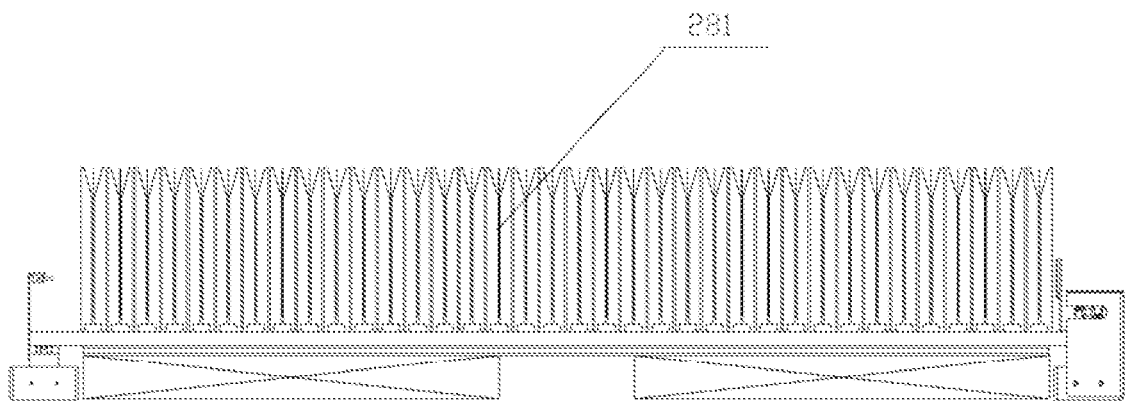
FIG. 20 is a front view of an air cooling clamp according to the present invention.
Figure 21:
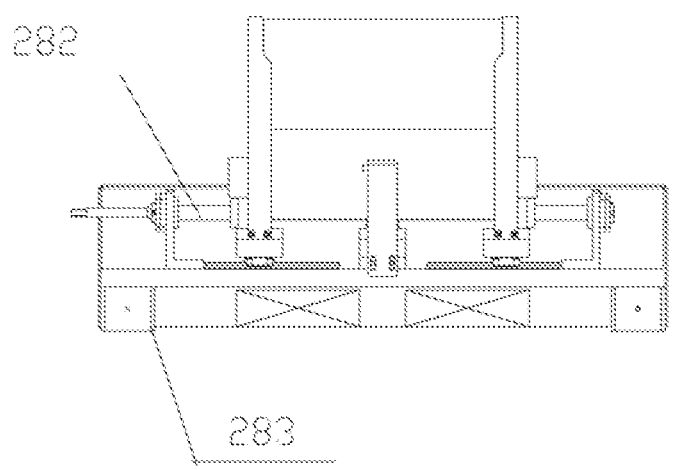
FIG. 21 is a side view of an air cooling clamp according to the present invention.
Figure 22:
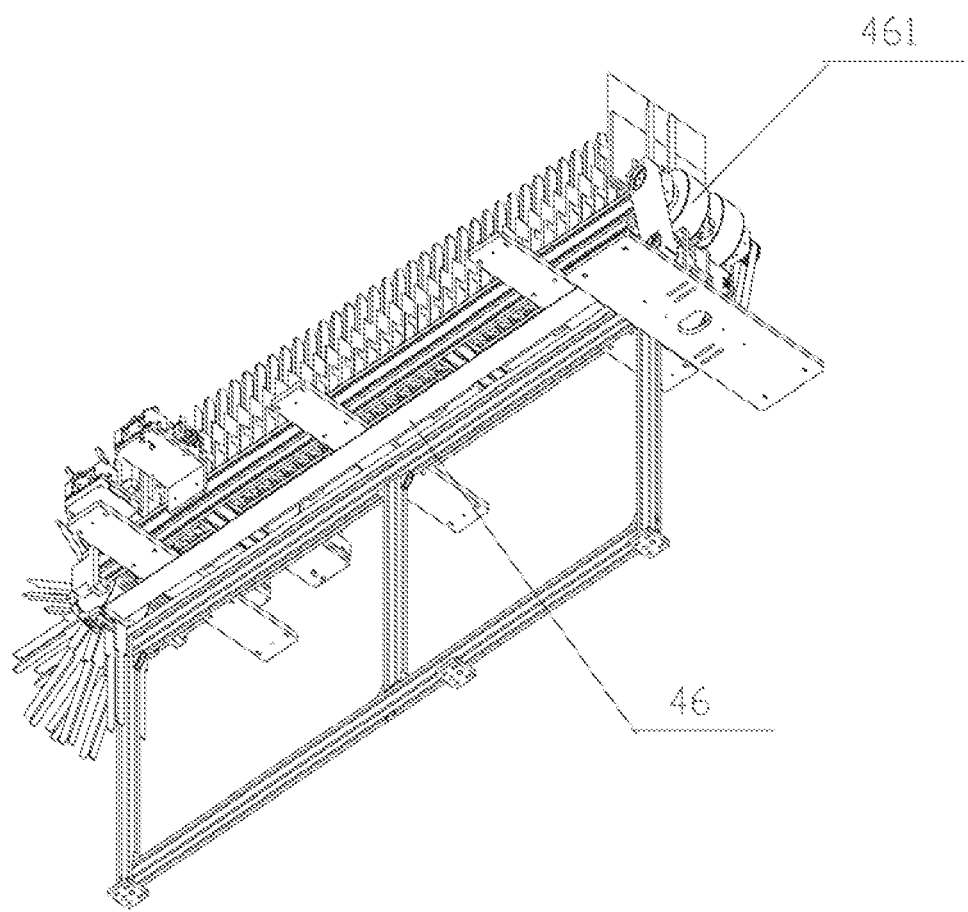
FIG. 22 is a schematic view of a hydraulic mechanism of a loading and unloading portion according to the present invention.
Figure 23:
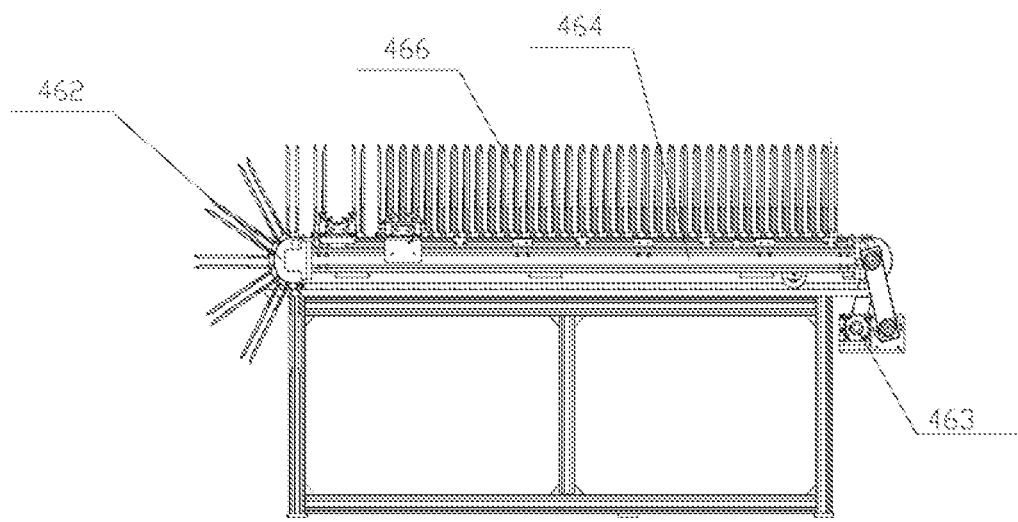
FIG. 23 is a front view of a hydraulic mechanism of a loading and unloading portion according to the present invention.
Figure 24:
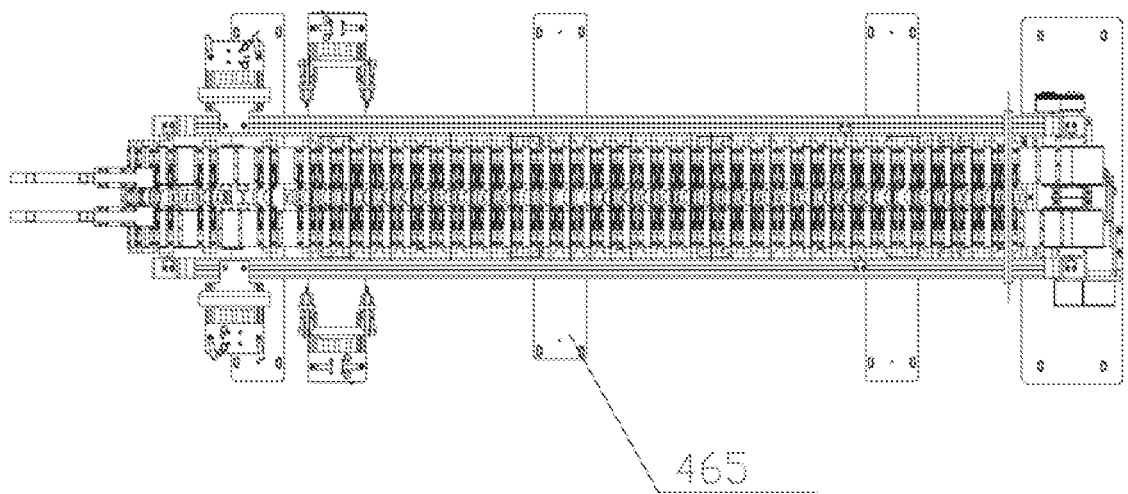
FIG. 24 is a top view of a hydraulic mechanism of a loading and unloading portion according to the present invention.
Figure 25:
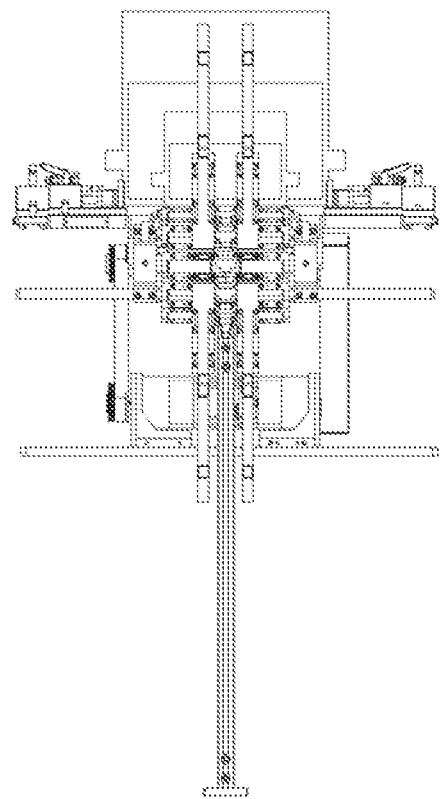
FIG. 25 is a side view of a hydraulic mechanism of a loading and unloading portion according to the present invention.
Figure 26:
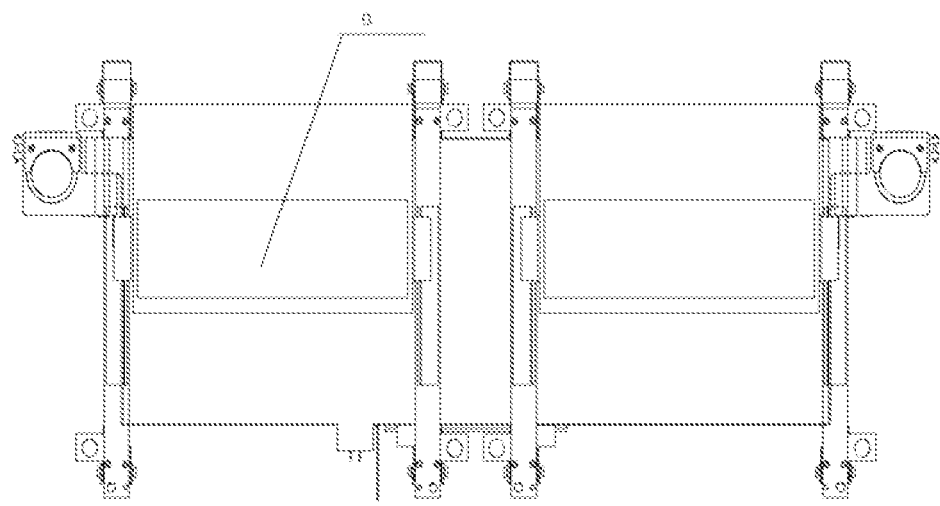
FIG. 26 is a schematic view showing a contact structure for a battery with double-sided lugs according to the present invention.
Figure 27:
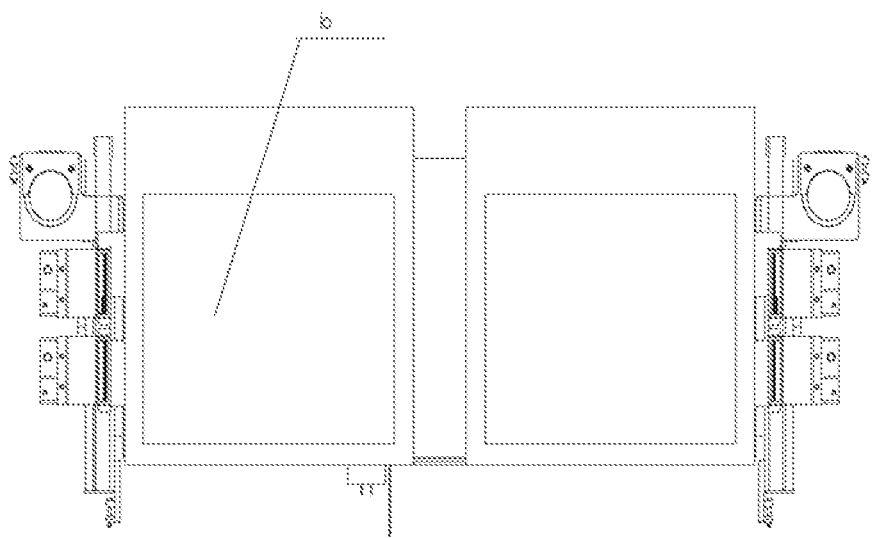
FIG. 27 is a schematic view showing a contact structure for a battery with single-sided lugs according to the present invention.

The present invention will be further described below with reference to the accompanying drawings.

Referring to the accompanying drawings:

Embodiment 1: The formation capacity-grading equipment with hot- and cold-press clamps for a soft-package lithium battery according to the present invention comprises: a plurality of sets of capacity grading devices and a maintenance unit 9 connecting the capacity grading devices, where the capacity grading devices are superimposed on each other to form a layered structure, and the capacity grading devices are kept to be axially parallel to each other; the maintenance unit is mounted lateral to the capacity grading devices; and the capacity grading device comprises an outer frame 10, a hot-press formation capacity grading hot-press clamp unit 1, a cold-press forming clamp unit 2, a charge and discharge formation control unit 3, a battery loading and unloading unit 4, a transplant manipulator unit 5, a production process control and detection and safety alarm unit 6, a central controller 7, and a database unit 8, in which a work station for processing the battery is provided on the outer frame 10; both the hot-press formation capacity grading hot-press clamp unit 1 and the charge and discharge formation control unit 2 are axially disposed inside the outer frame, and each hot-press formation capacity grading hot-press clamp unit 2 corresponds to a respective charge and discharge formation control unit 3; the cold-press forming clamp unit 2, the battery loading and unloading unit 4, and the transplant manipulator unit 5 are arranged at the work station on the outer frame 10, where the cold-press forming clamp unit 2 is arranged downstream of the hot-press formation capacity grading hot-press clamp unit, and the transplant manipulator unit 5 moves in an extent covering the entire work station; the production process control and detection and safety alarm unit, the central controller 7, and the database unit 8 are all mounted on the outer frame 10; a signal transmission end of the production process control and detection and safety alarm unit is in bidirectional communication with a signal transmission end of the central controller; and a signal transmission end of the central controller 7 is electrically connected to a signal transmission end of the database unit 8.

The hot-press formation capacity grading hot-press clamp unit 1 comprises a first servomotor 11 for providing a driving force, a first deceleration motor 12 for proportionally adjusting the driving force provided by the servomotor, a first gear box 13 for transmitting the reduced driving force, a first ballscrew nut pair 14 for converting the rotation to horizontal movement, a plurality of first clamp plates 16 for isolating and capacity-grading pressing the batteries, a first guide rod 15 for providing horizontal support to the first clamp plate, a first pressure detection assembly 17 for measuring the pressure produced by the clamp plate driven by the first servomotor, and a heat control assembly for heating, where an output shaft of the first servomotor 11 is coupled to an input shaft of the first deceleration motor 12; an output shaft of the first deceleration motor 12 is connected to an end portion of a first screw 141 of the first ballscrew nut pair 14 via the first gear box 13 to drive the first screw to rotate about its central axis; the first screw 141 is axially mounted on and rotatably connected to the outer frame; a first ball nut 142 of the first ballscrew nut pair 14 is mounted around and screwed onto the first screw 141; the first ball nut is fixed to the outermost first clamp plate 16; adjacent first clamp plates are connected by connectors to achieve mutual linkage between the first clamp plates to simultaneously clamp or loosen the soft-package lithium batteries located between two adjacent clamp plates; the first clamp plate 16 is mounted around the first guide rod 15, and the first clamp plate 16 is in clearance fit with the first guide rod 15, to enable the first clamp plate 16 to axially slide along the first guide rod; the first pressure detection assembly 17 is sandwiched between the first clamp plate 16 and the first ballscrew nut pair 141; and the heat control assembly is arranged on the first pressure control assembly 17.

The cold-press forming clamp unit 2 comprises a second servomotor 21 for providing a driving force, a second deceleration motor 22 for proportionally adjusting the driving force provided by the second servomotor, a second gear box 23 for transmitting the reduced driving force, a second ballscrew nut pair 24 for converting the rotation to horizontal movement, a plurality of second clamp plates 26 for isolating and pressing the batteries, a second guide rod 25 for providing horizontal support to the second clamp plate, a second pressure detection assembly 27 for measuring the pressure produced by the clamp plate driven by the servomotor, and an air cooling mechanism 28 and a water cooling mechanism for cooling the battery, where an output shaft of the second servomotor 21 is coupled to an input shaft of the second deceleration motor 22; an output shaft of the second deceleration motor 22 is connected to an end portion of a second screw of the first ballscrew nut pair 24 via the second gear box 23 to drive the second screw to rotate about its central axis; the second screw is axially mounted on and rotatably connected to the outer frame; a second ball nut of the second ballscrew nut pair is mounted around and screwed onto the second screw; the second ball nut is fixed to the outermost second clamp plate 26; adjacent second clamp plates 26 are connected by connectors to achieve mutual linkage between the second clamp plates to simultaneously clamp or loosen the soft-package lithium batteries between two adjacent clamp plates; the second clamp plate 26 is mounted around the second guide rod 25, and the second clamp plate 26 is in clearance fit with the second guide rod 25, to enable the second clamp plate 26 to axially slide along the second guide rod; the second pressure detection assembly 27 is sandwiched between the second clamp plate and the second ballscrew nut pair; the air cooling mechanism 28 comprises a baffle 281, a changeover screw 282, a support plate assembly 283, and a fan assembly, where the baffle 281 is in one-to-one correspondence with the second clamp plate 26, the baffle 281 is attached to the surface of a corresponding second clamp plate 26 and supported by the battery support plate fixed on the outer frame, and adjacent two baffles 281 are provided with a gap for positioning the battery therein; the changeover screw 282 is screwed to the baffle 281, to achieve the adjustment of the gap between adjacent baffles 281; and the fan assembly is provided at a working station of the cold-press forming clamp unit on the outer frame, and has an air outlet facing the baffle; and the water cooling mechanism comprises a water pipe in communication with an external water source and a control valve for controlling the flow rate in the water pipe, where the surface of the water pipe is fitted to the surface of a corresponding second clamp plate, and each of the second clamp plates is provided with a corresponding length of water pipe, and the control valve is arranged on the water pipe.

The charge and discharge device comprises a charge and discharge drive board for energizing the polymer soft-package battery, a connecting wire, a power source and a mounting frame, where the charge and discharge drive board and the power source are mounted on the mounting frame, in which a power supply end of the charge and discharge drive board is connected to the electrode lug of the polymer soft-package battery via the connecting wire and a contact pin; and a power supply end of the power source is electrically connected to a charging end of the charge and discharge drive board, to realize a power supply module for charging and discharging the battery.

The transplant manipulator unit 5 comprises a horizontal moving mechanism 51, a vertical lifting mechanism 52, a battery clamping mechanism 53, and a transplant base 54, where the horizontal moving mechanism 51 comprises a third servomotor for providing a horizontal driving force, a toothed rack 512 for transmitting the horizontal driving force, a horizontal guide rail 513 allowing the battery clamping mechanism to slide axially and horizontally along the outer frame, and a transplant mounting bracket 514 for mounting the vertical lifting mechanism, in which the third servomotor is mounted on the transplant base 54, an output gear of the third servomotor is engaged with the toothed rack 512, the toothed rack 512 is fixed to the transplant mounting bracket 514, and the toothed rack 512 is slidably connected to the horizontal guide rail 513; the vertical lifting mechanism 52 comprises a fourth servomotor for providing a vertical driving force and a screw 522 for transmitting the vertical driving force, where the fourth servomotor is mounted on the transplant mounting bracket 514, an output shaft of the fourth servomotor is fixed to one end of the screw 522 by a timing pulley and belt 521, and the screw 522 is screwed to the battery clamping mechanism; the battery clamping mechanism 53 comprises a battery gripping jaw for gripping the battery and a jaw mounting plate for mounting the battery gripping jaw, where the jaw mounting plate is screwed to the screw 522, a bottom of the jaw mounting plate is provided with a row of battery gripping jaws along its axial direction, and the battery gripping jaws are arranged in a direction that is the same as the direction of arrangement for the first clamp plates of the hot-press formation capacity grading hot-press clamp unit 1; the horizontal moving mechanism motions in the horizontal direction under the action of the gear and toothed rack 512 driven by the third servomotor; the vertical lifting mechanism motions up and down in the vertical direction under the action of the screws at both sides caused to move by the timing pulley and belt driven by the fourth servomotor; and the battery clamping mechanism 53 is a mechanism for gripping the battery.

The battery loading and unloading unit 4 comprises a double speed chain conveyor unit 42, a tray loading and unloading manipulator unit 43, a battery scanning and rotating unit 44, a battery NG unit 45, a hydraulic loading and unloading manipulator unit 47, and a battery transit hydraulic machine 46, where the double speed chain conveyor unit 42, the tray loading and unloading manipulator unit 43, the battery scanning and rotating unit 44, the battery NG unit 45, the hydraulic loading and unloading manipulator unit 47, the battery transit hydraulic machine 46, and the central controller are all mounted on the outer frame 10, and each of the units is in signal connection with the central controller.

The central controller 7 comprises an automatic production process control unit, a temperature control unit, a pressurizing and pressure holding unit, a loading and unloading control unit, a charge and discharge cycle control unit, an alarm control unit, a human-machine interface, and a data processing unit, where a signal input of the automatic production process control unit is electrically connected to a signal output of the human-machine interface; a signal output of the automatic production process control unit, a signal input of the temperature control unit, a signal input of the pressurizing and pressure holding unit, and a signal input of the charge and discharge cycle control unit are respectively electrically connected to a corresponding signal input of the data processing unit; signal outputs of the data processing unit are respectively electrically connected to a signal input of the loading and unloading control unit, a signal input of the transplant manipulator unit, and a signal input of the safety alarm control unit; signal outputs of the temperature control unit are respectively electrically connected to a control end of the first servomotor in the hot-press formation clamp unit and a control end of the second servomotor in the cold-press forming clamp unit; a signal input of the pressurizing and pressure holding unit is in bidirectional signal connection respectively with a signal output of the first pressure detection assembly in the hot-press formation clamp unit and a signal output of the second pressure detection assembly in the cold-press forming clamp unit; and the control valve of the water cooling mechanism and a control end of the air cooling mechanism in the cold-press forming clamp unit are respectively in signal connection with a corresponding signal output of the temperature control unit.

The maintenance unit 9 comprises a maintenance platform 91 for walking and a stair 92 for climbing, where the maintenance platform 91 is disposed lateral to the capacity grading device, and the maintenance platform 91 is arranged along an axial direction of the capacity grading device; and the stair 92 is disposed beside the maintenance platform 91, and one end of the stair is connected to the maintenance platform 91 and the other end is connected to a mounting face.

The double speed chain conveyor unit 42 comprises a double speed chain conveyor 421 for delivering the tray, a double speed chain 422, a double speed chain profile 423 and a timing belt assembly, where the double speed chain 422 is mounted on the outer frame 10 by the double speed chain profile 423; one end of the double speed chain 422 extends to the battery scanning and rotating unit, and the other end extends to the battery NG unit; the double speed chain is connected to an output end of the second deceleration motor by the timing belt assembly to allow the double speed chain to run along the axial direction; and a control end of the second deceleration motor is electrically connected to a corresponding pin of the controller.

The tray loading and unloading manipulator unit 43 is arranged between the double speed chain conveyor unit 42 and the battery scanning and rotating unit 44, to enable the battery to transport from the double speed chain to the battery scanning and rotating unit. The tray loading and unloading manipulator unit comprises a tray loading manipulator unit 431 and a tray unloading manipulator unit 432, where both the tray loading manipulator unit 431 and the tray unloading manipulator unit 432 comprise a first battery gripping jaw for gripping the battery, a first three-dimensional module for enabling the battery gripping motion, and a first battery detection sensor for detecting the gripping state of the battery gripping jaw, in which the first three-dimensional module is disposed near the double speed chain conveyor unit; the first three-dimensional module comprises a first rotary cylinder movable along the X-axis, a second rotary cylinder movable along the Y-axis, and a third rotary cylinder movable along the Z-axis, the third rotary cylinder being mounted on the outer frame, the second rotary cylinder being fixed to the piston rod of the third rotary cylinder, and the first rotary cylinder being fixed to the piston rod of the third rotary cylinder; the first battery gripping jaw is mounted on the piston rod of the first rotary cylinder, to enable the first battery gripping jaw to move along the X axis, Y axis and Z axis; a control end of the first battery gripping jaw is electrically connected to a corresponding signal output of the controller; and the first battery detection sensor is disposed on the battery gripping jaw, and a signal output of the first battery detection sensor is electrically connected to a corresponding signal input of the controller.

The battery scanning and rotating unit comprises a battery transplant module, a battery scanner, and a fourth rotary cylinder for realizing the horizontal rotation of the battery, where the fourth rotary cylinder is disposed at a battery scanning and rotating station at one end of the double speed chain between the double speed chain and the battery transplant module; an output end of the fourth rotary cylinder is equipped with a turntable capable of horizontal rotation; the battery scanner and the battery transplant module are mounted on the turntable; the battery is removed from double speed chain to a loading waiting station for a next procedure by the battery transplant module; and a signal output of the battery scanner, a control end of the battery transplant module, and a control end of the fourth rotary cylinder are respectively electrically connected to a corresponding pin of the controller.

The hydraulic loading and unloading manipulator unit comprises a hydraulic loading manipulator unit and a hydraulic unloading manipulator unit, which are used to load the scanned battery to the battery transit hydraulic machine and the battery NG unit, and both comprise a second battery gripping jaw for gripping the battery, a second three-dimensional module for enabling the battery gripping motion, and a second battery detection sensor for detecting the gripping state of the battery gripping jaw, in which the second three-dimensional module is disposed near the double speed chain conveyor unit; the second three-dimensional module comprises a fifth rotary cylinder movable along the X-axis, a sixth rotary cylinder movable along the Y-axis, and a seventh rotary cylinder movable along the Z-axis, the seventh rotary cylinder being mounted on the outer frame, the sixth rotary cylinder being fixed to the piston rod of the seventh rotary cylinder, and the sixth rotary cylinder being fixed to the piston rod of the fifth rotary cylinder; the second battery gripping jaw is mounted on the piston rod of the fifth rotary cylinder, to enable the second battery gripping jaw to move along the X axis, Y axis and Z axis; a control end of the second battery gripping jaw is electrically connected to a corresponding signal output of the controller; and the second battery detection sensor is disposed on the second battery gripping jaw, and a signal output of the second battery detection sensor is electrically connected to a corresponding signal input of the controller.

The battery transit hydraulic machine 46 comprises a battery unloading hydraulic machine and a battery loading hydraulic machine, which have the same structure and both comprise a timing belt 461, a timing pulley 462, a servomotor 463, a support profile 464, a mounting support plate 465, a battery baffle 466, and a battery tuning cylinder assembly, where the mounting support plate is mounted on the outer frame, the support profile is provided on the mounting support plate, the two ends of the support profile are respectively provided with a timing pulley, and the timing pulleys at the two ends are connected by a timing belt to realize the synchronous rotation of the timing pulleys; one of the timing pulleys is connected to an output shaft of the servomotor; a plurality of vertically arranged battery baffles are provided on the surface of the timing belt, and a gap for accommodating the battery is retained between two adjacent baffles; one end of the battery transit hydraulic machine is connected to the battery NG unit, and the other end of the battery transit hydraulic machine extends to a next work station; and the servomotor drives the timing pulley to rotate, so the battery baffle on the timing belt is dragged to move, which in turn drives the battery between the battery baffles to run.

The battery NG unit 45 is used to sort poor batteries, and comprises rollers, a baffle, a position sensor, a tray positioning cylinder and a battery waiting unit, where the tray positioning cylinder is disposed on a platform for placement of the battery NG unit, and the platform is provided with, on both sides of the platform, a plurality of rollers arranged along an axial direction; the baffle is mounted at an end of the platform for placement, and the position sensor is disposed on the platform at the side where the baffle is mounted; the battery waiting unit is a work station for transiting of the battery after the battery scan fails, and comprises a second battery baffle, a third battery detection sensor, an adjusting wrench, and a mounting seat, where the mounting seat is provided on the outer frame besides the platform for placement, a sliding bracket for mounting the second battery baffle is symmetrically mounted on the mounting seat, the sliding bracket is provided with the adjusting wrench for adjusting the distance between two second battery baffles, and the third battery detection sensor is mounted on the mounting seat between two second battery baffles; and a signal output of the position sensor and a signal output of the third battery detection sensor are electrically connected to a corresponding signal input of the controller, and a control end of the tray positioning cylinder is electrically connected to a corresponding pin of the controller.

The first pressure detection assembly has the same structure as that of the second pressure detection assembly, and comprises a spring buffer module for pressure buffering the clamp plate and a pressure sensor for measuring the pressure produced by the clamp plate driven by the servomotor, where the spring buffer module is sandwiched between the clamp plate and the ballscrew nut pair, one end of the spring buffer module is connected to the outermost clamp plate at the same side, and the other end is connected to the mounting plate of the ballscrew nut pair; and the pressure sensor is disposed between the mounting plate and the ball nut at the same side.

The bottom of the transplant mounting bracket is equipped with a battery drop prevention mechanism comprising a drop prevention tray and a connecting rod, where the drop prevention tray is provided at the bottom of the transplant mounting bracket via the connecting rod, to ensure that all the battery gripping jaws are located directly above the drop prevention tray.

The timing belt of the conveying hydraulic machine is a closed circular belt, only a part of the outer surface of the timing belt is provided with a battery baffle along the length direction, and two battery baffles face each other and are paired to form a clamp pair for holding the same battery, where the battery is held in the gap between the same clamp pair.

The automatic production line with cold- and hot-press clamps for formation and capacity-grading of a soft-package lithium battery has a number of side-by-side production lines are independent of each other.

There are two double speed chains, and the two double speed chains are arranged in parallel. The two ends of the transfer conveyor roller respectively extend to the two double speed chains, and the rolling direction of the transfer conveyor roller is perpendicular to the running direction of the double speed chain.

The present invention aims at improving the technology and optimizing and improving the process, and provides an automatic production equipment with cold- and hot-press clamps for formation and capacity-grading of a soft-package lithium battery. The equipment integrates the formation, capacity grading, hot pressing and cold pressing of the lithium battery into the same equipment, thereby shortening the time between various procedures and simplifying the process. By using only one set of loading and unloading equipment, the four procedures are combined, thus reducing the transit time and number of transfers of the battery. The battery is placed in the battery tray and undergoes automated unmanned operation by means of automated assembly lines and manipulators. In the above solution, the hot-press formation and capacity-grading clamp unit and the cold-press forming unit are able to perform formation, capacity grading, and hot and cold pressing on a soft-package lithium battery at a controllable temperature and a controllable charge and discharge current under a controllable pressure. The hot-press formation clamp, hot-press capacity grading clamp, and cold-press forming clamp function to perform formation and capacity grading on, and heat, pressurize, charge, and discharge batteries of single-sided and double-sided lugs. 1 to N batteries are placed at the left and right positions on a single clamp plate, and the charge and discharge power supply is connected to the electrode lugs of the battery through the lug probe board and wires for formation and capacity grading. The pressurization powering device of the hot-press clamp comprises a motor drive means or a cylinder power means, a transmission reducer, a guide shaft, a heating clamp plate, a pressure sensor, and a lug contact clamp. Steady clamp plates and controllable pressure can be achieved by means of such a mechanism.

In the above solution, the soft-package lithium battery needs to undergo the cooling and forming process immediately after the completion of the hot-press formation and capacity grading process, and the pressure applied by the clamp on the battery is controllable.

In the above solution, to achieve the sufficiently good electrical contact of the soft-package lithium battery in the hot-press clamp, N charge and discharge cycles are performed.

In the above solution, the automatic production process control and detection unit of soft-package lithium battery performs heating temperature control, pressurization and pressure maintenance control, loading and unloading workflow control, charge and discharge cycle control, and smoke detection and safety protection by using an intelligent control device, to achieve the orderly, fast and safe production of the automatic production line.

In the above solution, the system obtains various curves and charts for the parameters of the equipment, the tray position, the working stock position, the charge and discharge curve and the time in real time, and the historical data is stored.

The equipment performs formation, capacity grading, hot pressing and cold pressing on battery a with double-sided lugs and battery b with single-sided lugs. The clamp can be automatically changed according to the size range of the battery.

The description in the embodiments of the present specification is merely illustrative of the implementation forms of the inventive concept, and the scope of protection of the present invention should not be construed as being limited to the specific forms stated in the embodiments. The scope of protection of the present invention also comprises equivalent technical means suggested to those skilled in the art in accordance with the inventive concept.

What is claimed is:

1. A formation capacity-grading equipment with hot- and cold-press clamps for a soft-package lithium battery, comprising: a plurality of sets of capacity grading devices and a maintenance unit connecting the capacity grading devices, wherein the capacity grading devices are superimposed on each other to form a layered structure, and the capacity grading devices are kept to be axially parallel to each other; the maintenance unit is mounted on a side of the capacity grading devices; and the capacity grading device comprises an outer frame, a hot-press formation capacity grading hot-press clamp unit, a cold-press forming clamp unit, a charge and discharge formation control unit, a battery loading and unloading unit, a transplant manipulator unit, a production process control and detection and safety alarm unit, a central controller, and a database unit, wherein a work station for processing the battery is provided on the outer frame; both the hot-press formation capacity grading hot-press clamp unit and the charge and discharge formation control unit are axially disposed inside the outer frame, and each set of the hot-press formation capacity grading hot-press clamp unit corresponds to a respective set of the charge and discharge formation control unit; the cold-press forming clamp unit, the battery loading and unloading unit, and the transplant manipulator unit are arranged at the work station of the outer frame, wherein the cold-press forming clamp unit is arranged downstream of the hot-press formation capacity grading hot-press clamp unit, and the transplant manipulator unit moves in an extent covering the entire work station; the production process control and detection and safety alarm unit, the central controller, and the database unit are all mounted on the outer frame; a signal transmission end of the production process control and detection and safety alarm unit is in bidirectional communication with a signal transmission end of the central controller; and a signal transmission end of the central controller is electrically connected to a signal transmission end of the database unit, wherein the hot-press formation capacity grading hot-press clamp unit comprises a first servomotor for providing a driving force, a first deceleration motor for proportionally adjusting the driving force provided by the servomotor, a first gear box for transmitting the reduced driving force, a first ballscrew nut pair for converting the rotation to horizontal movement, a plurality of first clamp plates for isolating and capacity-grading pressing the batteries, a first guide rod for providing horizontal support to the first clamp plate, a first pressure detection assembly for measuring the pressure produced by the clamp plate driven by the first servomotor, and a heat control assembly for heating, wherein an output shaft of the first servomotor is coupled to an input shaft of the first deceleration motor; an output shaft of the first deceleration motor is connected to an end portion of a first screw of the first ballscrew nut pair via the first gear box to drive the first screw to rotate about its central axis; the first screw is axially mounted on and rotatably connected to the outer frame; a first ball nut of the first ballscrew nut pair is mounted around and screwed onto the first screw; the first ball nut is fixed to the outermost first clamp plate; adjacent first clamp plates are connected by connectors to achieve mutual linkage between the first clamp plates to simultaneously clamp or loosen the soft-package lithium batteries located between two adjacent clamp plates; the first clamp plate is mounted around the first guide rod, and the first clamp plate is in clearance fit with the first guide rod, to enable the first clamp plate to axially slide along the first guide rod; the first pressure detection assembly is sandwiched between the first clamp plate and the first ballscrew nut pair; and the heat control assembly is arranged on the first pressure control assembly;

wherein the cold-press forming clamp unit comprises a second servomotor for providing a driving force, a second deceleration motor for proportionally adjusting the driving force provided by the second servomotor; a second gear box for transmitting the reduced driving force, a second ballscrew nut pair for converting the rotation to horizontal movement, a plurality of second clamp plates for isolating and pressing the batteries, a second guide rod for providing horizontal support to the second clamp plate, a second pressure detection assembly for measuring the pressure produced by the clamp plate driven by the servomotor, and an air cooling mechanism and a water cooling mechanism for cooling the battery, wherein an output shaft of the second servomotor is coupled to an input shaft of the second deceleration motor; an output shaft of the second deceleration motor is connected to an end portion of a second screw of the first ballscrew nut pair via the second gear box to drive the second screw to rotate about its central axis; the second screw is axially mounted on and rotatably connected to the outer frame; a second ball nut of the second ballscrew nut pair is mounted around and screwed onto the second screw; the second ball nut is fixed to the outermost second clamp plate; adjacent second clamp plates are connected by connectors to achieve mutual linkage between the second clamp plates to simultaneously clamp or loosen the soft-package lithium batteries between two adjacent clamp plates; the second clamp plate is mounted around the second guide rod, and the second clamp plate is in clearance fit with the second guide rod, to enable the second clamp plate to axially slide along the second guide rod; the second pressure detection assembly is sandwiched between the second clamp plate and the second ballscrew nut pair; the air cooling mechanism comprises a baffle, a changeover screw, a support plate assembly, and a fan assembly, wherein the baffle is in one-to-one correspondence with the second clamp plate, the baffle is attached to the surface of a corresponding second clamp plate and supported by the battery support plate fixed on the outer frame, and adjacent two baffles are spaced with a gap for positioning the battery therebetween; the changeover screw is screwed to the baffle, to achieve the adjustment of the gap between adjacent baffles; and the fan assembly is provided at a working station of the cold-press forming clamp unit on the outer frame, and has an outlet facing the baffle; and the water cooling mechanism comprises a water pipe in communication with an external water source and a control valve for controlling the flow rate in the water pipe, wherein the surface of the water pipe is fitted to the surface of a corresponding second clamp plate, and each of the second clamp plates is provided with a corresponding length of water pipe, and the control valve is arranged on the water pipe;

wherein the charge and discharge device comprises a charge and discharge drive board for energizing the polymer soft-package battery, a connecting wire, a power source and a mounting frame, wherein the charge and discharge drive board and the power source are mounted on the mounting frame, wherein a power supply end of the charge and discharge drive board is connected to the electrode lug of the polymer soft-package battery via the connecting wire and a contact pin; and a power supply end of the power source is electrically connected to a charging end of the charge and discharge drive board, to realize a power supply module for charging and discharging the battery;

wherein the transplant manipulator unit comprises a horizontal moving mechanism, a vertical lifting mechanism, a battery clamping mechanism, and a transplant base, wherein the horizontal moving mechanism comprises a third servomotor for providing a horizontal driving force, a toothed rack for transmitting the horizontal driving force, a horizontal guide rail for allowing the battery clamping mechanism to slide axially and horizontally along the outer frame, and a transplant mounting bracket for mounting the vertical lifting mechanism, wherein the third servomotor is mounted on the transplant base, an output gear of the third servomotor is engaged with the toothed rack, the toothed rack is fixed to the transplant mounting bracket, and the toothed rack is slidably connected to the horizontal guide rail; the vertical lifting mechanism comprises a fourth servomotor for providing a vertical driving force and a screw for transmitting the vertical driving force, wherein the fourth servomotor is mounted on the transplant mounting bracket, an output shaft of the fourth servomotor is fixed to one end of the screw by a timing pulley and belt, and the screw is screwed to the battery clamping mechanism; the battery clamping mechanism comprises a battery gripping jaw for gripping the battery and a jaw mounting plate for mounting the battery gripping jaw, wherein the jaw mounting plate is screwed to the screw, a bottom of the jaw mounting plate is provided with a row of battery gripping jaws along its axial direction, and the battery gripping jaws are arranged in a direction that is the same as with the direction of arrangement for the first clamp plates of the hot-press formation capacity grading hot-press clamp unit; the horizontal moving mechanism motions in the horizontal direction under the action of the gear and toothed rack driven by the third servomotor; the vertical lifting mechanism motions up and down in the vertical direction under the action of the screws at both sides caused to move by the timing pulley and belt driven by the fourth servomotor; and the battery clamping mechanism is a mechanism for gripping the battery;

wherein the battery loading and unloading unit comprises a double speed chain conveyor unit, a tray loading and unloading manipulator unit, a battery scanning and rotating unit, a battery NG unit, a hydraulic loading and unloading manipulator unit, and a battery transit hydraulic machine, wherein the double speed chain conveyor unit, the tray loading and unloading manipulator unit, the battery scanning and rotating unit, the battery NG unit, the hydraulic loading and unloading manipulator unit, the battery transit hydraulic machine, and the central controller are all mounted on the outer frame, and each of the units is in signal connection with the central controller;

wherein the central controller comprises an automatic production process control unit, a temperature control unit, a pressurizing and pressure holding unit, a loading and unloading control unit, a charge and discharge cycle control unit, an alarm control unit, a human-machine interface, and a data processing unit, wherein a signal input of the automatic production process control unit is electrically connected to a signal output of the human-machine interface; a signal output of the automatic production process control unit, a signal input of the temperature control unit, a signal input of the pressurizing and pressure holding unit, and a signal input of the charge and discharge cycle control unit are respectively electrically connected to a corresponding signal input of the data processing unit; signal outputs of the data processing unit are respectively electrically connected to a signal input of the loading and unloading control unit, a signal input of the transplant manipulator unit, and a signal input of the safety alarm control unit; signal outputs of the temperature control unit are respectively electrically connected to a control end of the first servomotor in the hot-press formation clamp unit and a control end of the second servomotor in the cold-press forming clamp unit; a signal input of the pressurizing and pressure holding unit is in bidirectional signal connection respectively with a signal output of the first pressure detection assembly in the hot-press formation clamp unit and a signal output of the second pressure detection assembly in the cold-press forming clamp unit; and the control valve of the water cooling mechanism and a control end of the air cooling mechanism in the cold-press forming clamp unit are respectively in signal connection with a corresponding signal output of the temperature control unit; and wherein the maintenance unit comprises a maintenance platform for walking and a stair for climbing, wherein the maintenance platform is disposed at a side of the capacity grading device, and the maintenance platform is arranged along an axial direction of the capacity grading device; and the stair is disposed beside the maintenance platform, and one end of the stair is connected to the maintenance platform and the other end is connected to a mounting face.

2. The formation capacity-grading equipment with hot- and cold-press clamps for a soft-package lithium battery according to claim 1, wherein the double speed chain conveyor unit comprises a double speed chain conveyor for delivering the tray, a double speed chain, a double speed chain profile and a timing belt assembly, wherein the double speed chain is mounted on the outer frame by the double speed chain profile; one end of the double speed chain extends to the battery scanning and rotating unit, and the other end of the double speed chain extends to the battery NG unit; the double speed chain is connected to an output end of the second deceleration motor by the timing belt assembly to allow the double speed chain to run along the axial direction; and a control end of the second deceleration motor is electrically connected to a corresponding pin of the controller.

3. The formation capacity-grading equipment with hot- and cold-press clamps for a soft-package lithium battery according to claim 1, wherein the tray loading and unloading manipulator unit is arranged between the double speed chain conveyor unit and the battery scanning and rotating unit, to enable the battery to transport from the double speed chain to the battery scanning and rotating unit; and the tray loading and unloading manipulator unit comprises a tray loading manipulator unit and a tray unloading manipulator unit, wherein each of the tray loading manipulator unit and the tray unloading manipulator unit comprises a first battery gripping jaw for gripping the battery, a first three-dimensional module for enabling the battery gripping motion, and a first battery detection sensor for detecting the gripping state of the battery gripping jaw, in which the first three-dimensional module is disposed near the double speed chain conveyor unit; the first three-dimensional module comprises a first rotary cylinder movable along the X-axis, a second rotary cylinder movable along the Y-axis, and a third rotary cylinder movable along the Z-axis, the third rotary cylinder being mounted on the outer frame, the second rotary cylinder being fixed to the piston rod of the third rotary cylinder, and the first rotary cylinder being fixed to the piston rod of the third rotary cylinder; the first battery gripping jaw is mounted on the piston rod of the first rotary cylinder, to enable the first battery gripping jaw to move along the X axis, Y axis and Z axis; a control end of the first battery gripping jaw is electrically connected to a corresponding signal output of the controller; and the first battery detection sensor is disposed on the battery gripping jaw, and a signal output of the first battery detection sensor is electrically connected to a corresponding signal input of the controller.

4. The formation capacity-grading equipment with hot- and cold-press clamps for a soft-package lithium battery according to claim 1, wherein the battery scanning and rotating unit comprises a battery transplant module, a battery scanner, and a fourth rotary cylinder for realizing the horizontal rotation of the battery, wherein the fourth rotary cylinder is disposed at a battery scanning and rotating station at one end of the double speed chain between the double speed chain and the battery transplant module; an output end of the fourth rotary cylinder is equipped with a turntable capable of horizontal rotation; the battery scanner and the battery transplant module are mounted on the turntable; the battery is removed from double speed chain to a loading waiting station for a next procedure by the battery transplant module; and a signal output of the battery scanner, a control end of the battery transplant module, and a control end of the fourth rotary cylinder are respectively electrically connected to a corresponding pin of the controller.

5. The formation capacity-grading equipment with hot- and cold-press clamps for a soft-package lithium battery according to claim 1, wherein the hydraulic loading and unloading manipulator unit comprises a hydraulic loading manipulator unit and a hydraulic unloading manipulator unit, which are used to load the scanned battery to the battery transit hydraulic machine and the battery NG unit, and comprise a second battery gripping jaw for gripping the battery, a second three-dimensional module for enabling the battery gripping motion, and a second battery detection sensor for detecting the gripping state of the battery gripping jaw, in which the second three-dimensional module is disposed near the double speed chain conveyor unit; the second three-dimensional module comprises a fifth rotary cylinder movable along the X-axis, a sixth rotary cylinder movable along the Y-axis, and a seventh rotary cylinder movable along the Z-axis, the seventh rotary cylinder being mounted on the outer frame, the sixth rotary cylinder being fixed to the piston rod of the seventh rotary cylinder, and the sixth rotary cylinder being fixed to the piston rod of the fifth rotary cylinder; the second battery gripping jaw is mounted on the piston rod of the fifth rotary cylinder, to enable the second battery gripping jaw to move along the X axis, Y axis and Z axis; a control end of the second battery gripping jaw is electrically connected to a corresponding signal output of the controller; and the second battery detection sensor is disposed on the second battery gripping jaw, and a signal output of the second battery detection sensor is electrically connected to a corresponding signal input of the controller;

wherein the battery transit hydraulic equipment comprises a timing belt, a timing pulley, a servomotor, a support profile, a mounting support plate, a battery baffle, and a battery tuning cylinder assembly, where the mounting support plate is mounted on the outer frame, the support profile is provided on the mounting support plate, the two ends of the support profile are respectively provided with a timing pulley, and the timing pulleys at the two ends are connected by a timing belt to realize the synchronous rotation of the timing pulleys; one of the timing pulleys is connected to an output shaft of the servomotor; a plurality of vertically arranged battery baffles are provided on the surface of the timing belt, and a gap for accommodating the battery is retained between two adjacent baffles; one end of the battery transit hydraulic machine is connected to the battery NG unit, and the other end of the battery transit hydraulic machine extends to a next work station; and the servomotor drives the timing pulley to rotate, so the battery baffle on the timing belt is dragged to move, which in turn drives the battery between the battery baffles to run; and wherein the battery NG unit is used to sort poor batteries, and comprises rollers, a baffle, a position sensor, a tray positioning cylinder and a battery waiting unit, where the tray positioning cylinder is disposed on a platform for placement of the battery NG unit, and the platform is provided with, on both sides of the platform, a plurality of rollers arranged along an axial direction; the baffle is mounted at an end of the platform for placement, and the position sensor is disposed on the platform at the side where the baffle is mounted; the battery waiting unit is a work station for transiting of the battery after the battery scan fails; and comprises a second battery baffle, a third battery detection sensor, an adjusting wrench, and a mounting seat, where the mounting seat is provided on the outer frame besides the platform for placement, a sliding bracket for mounting the second battery baffle is symmetrically mounted on the mounting seat, the sliding bracket is provided with the adjusting wrench for adjusting the distance between two second battery baffles, and the third battery detection sensor is mounted on the mounting seat between two second battery baffles; and a signal output of the position sensor and a signal output of the third battery detection sensor are electrically connected to a corresponding signal input of the controller, and a control end of the tray positioning cylinder is electrically connected to a corresponding pin of the controller.

6. The formation capacity-grading equipment with hot- and cold-press clamps for a soft-package lithium battery according to claim 1, wherein the first pressure detection assembly has the same structure as that of the second pressure detection assembly, and comprises a spring buffer module for pressure buffering the clamp plate and a pressure sensor for measuring the pressure produced by the clamp plate driven by the servomotor driven clamp plate, where the spring buffer module is sandwiched between the clamp plate and the ballscrew nut pair, one end of the spring buffer module is connected to the outermost clamp plate at the same side, and the other end is connected to the mounting plate of the ballscrew nut pair; and the pressure sensor is disposed between the mounting plate and the ball nut at the same side.

7. The formation capacity-grading equipment with hot- and cold-press clamps for a soft-package lithium battery according to claim 1, wherein the timing belt of the conveying hydraulic machine is a closed circular belt, and only a part of the outer surface of the timing belt is provided with a battery baffle along the length direction, and two battery baffles face each other and are paired to form a clamp pair for holding the same battery, where the battery is held in the gap between the same clamp pair.

* * * * *